(12) United States Patent
Shibano et al.

(10) Patent No.: US 10,193,160 B2
(45) Date of Patent: Jan. 29, 2019

(54) COMPOSITE CURRENT COLLECTOR FOR ENERGY STORAGE DEVICE ELECTRODE, AND ELECTRODE

(71) Applicant: NISSAN CHEMICAL INDUSTRIES, LTD., Tokyo (JP)

(72) Inventors: Yuki Shibano, Funabashi (JP); Shigeru Mitsui, Sodegaura (JP); Takuji Yoshimoto, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 506 days.

(21) Appl. No.: 14/428,074

(22) PCT Filed: Sep. 6, 2013

(86) PCT No.: PCT/JP2013/074010
§ 371 (c)(1),
(2) Date: Mar. 13, 2015

(87) PCT Pub. No.: WO2014/042080
PCT Pub. Date: Mar. 20, 2014

(65) Prior Publication Data
US 2015/0228982 A1 Aug. 13, 2015

(30) Foreign Application Priority Data
Sep. 14, 2012 (JP) ................. 2012-202596

(51) Int. Cl.
*H01M 4/66* (2006.01)
*H01G 11/28* (2013.01)
(Continued)

(52) U.S. Cl.
CPC ............ *H01M 4/668* (2013.01); *H01G 11/06* (2013.01); *H01G 11/28* (2013.01); *H01G 11/36* (2013.01);
(Continued)

(58) Field of Classification Search
None
See application file for complete search history.

(56) References Cited

U.S. PATENT DOCUMENTS

2009/0181309 A1  7/2009 Kwon et al.
2010/0028773 A1  2/2010 Hirota et al.
(Continued)

FOREIGN PATENT DOCUMENTS

CN   101548418 A   9/2009
JP   9-97625 A     4/1997
(Continued)

OTHER PUBLICATIONS

International Search Report, issued in PCT/JP2013/074010, dated Nov. 26, 2013.
(Continued)

*Primary Examiner* — Wyatt P McConnell
(74) *Attorney, Agent, or Firm* — Birch, Stewart, Kolasch & Birch, LLP

(57) ABSTRACT

A hyper-branched polymer dispersant represented by, for example, formula (I) has high adhesion properties to a current collector substrate and therefore enables the formation of an electrically conductive bonding layer having high carbon nanotube concentration. When a composite current collector for an energy storage device electrode which is equipped with the electrically conductive bonding layer is used, it becomes possible to produce an energy storage device from which an electrical current can be extracted without causing the decrease in a voltage particularly in use applications that require a large electrical current instantaneously, such as electrical automotive applications, and which has a long cycle life.

(Continued)

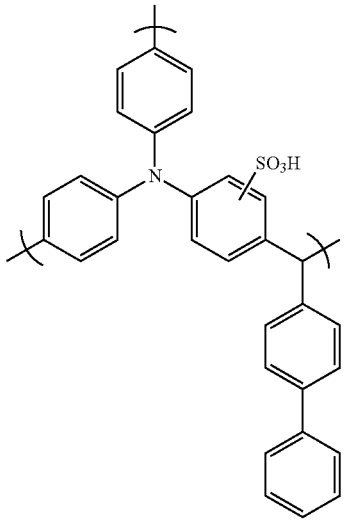

14 Claims, 7 Drawing Sheets

(51) Int. Cl.
*H01G 11/68* (2013.01)
*H01G 11/66* (2013.01)
*H01G 11/06* (2013.01)
*H01G 11/36* (2013.01)
*H01G 11/48* (2013.01)
*H01M 4/13* (2010.01)
*H01M 10/0525* (2010.01)

(52) U.S. Cl.
CPC ............ *H01G 11/48* (2013.01); *H01G 11/66* (2013.01); *H01G 11/68* (2013.01); *H01M 4/663* (2013.01); *H01M 4/667* (2013.01); *H01M 4/13* (2013.01); *H01M 4/661* (2013.01); *H01M 10/0525* (2013.01); *Y02E 60/122* (2013.01); *Y02E 60/13* (2013.01)

(56) References Cited

U.S. PATENT DOCUMENTS

2011/0091771 A1* 4/2011 Sannan .................. C09D 5/002
                                                                    429/217
2012/0268840 A1    10/2012 Hida et al.

FOREIGN PATENT DOCUMENTS

| JP | 11-149916 A | 6/1999 |
| JP | 2000-11991 A | 1/2000 |
| JP | 2007-165054 A | 6/2007 |
| JP | 2009-170410 A | 7/2009 |
| JP | 2010-163570 A | 7/2010 |
| WO | WO 2011/065395 A1 | 6/2011 |

OTHER PUBLICATIONS

Written Opinion of the International Searching Authority, issued in PCT/JP2013/074010, dated Nov. 26, 2013.
Chinese Office Action and Chinese Search Report, dated Sep. 23, 2016, for Chinese Application No. 201380047677.4.

* cited by examiner

COMPOSITE CURRENT COLLECTOR FOR ENERGY STORAGE DEVICE ELECTRODE, AND ELECTRODE

TECHNICAL FIELD

The present invention relates to a composite current collector for an energy storage device electrode, and to an electrode. More specifically, the invention relates to a composite current collector for secondary batteries such as lithium ion secondary batteries or for capacitors, and to an electrode in which such a composite current collector is used.

BACKGROUND ART

With the need for smaller size, lower weight and higher functionality in portable electronic devices such as smart phones, digital cameras and handheld gaming devices, active progress is being made recently in the development of high-performance batteries and demand for secondary batteries, which can be repeatedly used by charging, is growing rapidly.

Lithium ion secondary batteries in particular, because of their high energy density and high voltage, and also because they lack a memory effect during charging and discharging, are the secondary batteries currently undergoing the most vigorous advances in development.

In addition, as part of recent efforts to tackle environmental problems, active progress is also being made in the development of electrical vehicles, and higher performance has come to be desired of the secondary batteries that serve as the power source for such vehicles.

Lithium ion secondary batteries have a structure with a container in which are housed a positive electrode and a negative electrode capable of intercalating and deintercalating lithium and a separator interposed between the electrodes, and which is filled with a electrolyte (in the case of lithium ion polymer secondary batteries, a gel-like or completely solid electrolyte instead of a liquid electrolyte).

The positive and negative electrodes are generally formed by placing a composition which includes an active material capable of intercalating and deintercalating lithium, a conductive material consisting primarily of a carbon, material and a polymer binder as a layer on a current collector made of copper foil, aluminum foil or the like. The binder is used to bond the active material with the conductive material, and also to bond these with the metal foil. Fluoropolymers such as N-methylpyrrolidone (NMP)-soluble polyvinylidene fluoride (PVdF), aqueous dispersions of olefin polymers and the like are commercially available as such binders.

As noted above, lithium ion secondary batteries also show promise in use as a power source for electric vehicles and the like, and so it is desired that such batteries have a longer life and better safety than has hitherto been achieved.

However, the bonding strength of the above binders to the current collector is less than adequate. During production operations such as electrode plate cutting steps and winding steps, some of the active material and conductive material peels from the current collector and falls off, giving rise to micro-shorting and variability in the battery capacity.

In addition, with long-term use, due to swelling of the binder on account of the liquid electrolyte or to changes in the volume of the electrode mixture associated with volume changes resulting from lithium intercalation and deintercalation by the active material, the contact resistance between the electrode mixture and the current collector increases or some of the active material or conductive material peels from the current collector and falls off, leading to a deterioration in the battery capacity and leading also to problems from the standpoint of safety.

In particular, advances have been made recently in the development of active materials which, in positive electrode systems, are solid solution systems and, in negative electrode systems, are alloy systems of silicon or the like. These active materials have a larger charge/discharge capacity than pre-existing active materials, and thus experience a larger change in volume with charging and discharging. As a result, the peeling of such electrode mixtures from the current collector is a problem in urgent need of a solution.

Techniques that involve inserting an electrically conductive bonding layer between the current collector and the electrode mixture have been developed as attempts to solve the above problems.

For example, Patent Document 1 discloses the art of disposing, as a bonding layer between the current collector and the electrode mixture, an electrically conductive layer in which carbon serves as a conductive filler. This publication indicates that, by using a composite current collector having a conductive bonding layer (also referred to below simply as a "composite current collector"), the contact resistance between the current collector and the electrode mixture can be decreased, loss of capacity during high-speed discharge can be suppressed, and deterioration of the battery can be minimized. Similar art is disclosed also in Patent Documents 2 and 3.

In these examples, carbon particles are used as the conductive filler, but because carbon particles do not have a bonding action with respect to the current collector, a bonding layer is created using a polymer that serves as a matrix. Of course, the bonding strength rises as the polymer content becomes larger. However, as the polymer content increases, contact between the carbon particles decreases, and so the resistance of the bonding layer rises abruptly. As a result, the resistance of the battery as a whole rises.

To solve such problems, examples have been reported in which a fibrous carbon such as carbon nanotubes (abbreviated below as "CNTs") is used as the conductive filler.

For example, Patent Document 4 reports the use of multi-walled carbon nanotubes (abbreviated below as "MWCNTs") as the CNTs to form a conductive bonding layer on an aluminum foil, thereby making it possible to increase the cycle life of lithium ion secondary batteries. However, in Patent Document 4, because the dispersant used when forming the MWCNT-containing conductive bonding layer has a low dispersibility, it has been necessary to carry out spray coating a plurality of times in order to obtain a layer of sufficient film thickness.

In order to form a film by a CNT coating process, it is generally necessary to uniformly disperse CNTs in a solvent. There are techniques which involve surface modifying CNTs by a chemical process, and techniques which involve the concomitant use of a dispersant such as a polymer. Of these, techniques involving the concomitant use of a dispersant do not worsen the excellent electrical properties of CNTs, and so may be regarded as a preferred method in cases where the CNTs are used as an electrically conductive filler.

However, dispersants capable of dispersing CNTs to a high concentration have a low adhesion to the current collectors used in secondary batteries. To obtain a binder layer having excellent electrical conductivity, it is necessary to add a polymer or the like having the ability to adhere to the current collector. A problem in such cases is that the CNT concentration within the conductive binder layer decreases, as a result of which the electrical conductivity declines.

PRIOR ART DOCUMENTS

Patent Documents

Patent Document 1: JP-A H09-097625
Patent Document 2: JP-A 2000-011991
Patent Document 3: JP-A H11-149916
Patent Document 4: JP-A 2009-170410

SUMMARY OF THE INVENTION

Problems to be Solved by the Invention

It is therefore an object of the invention to provide a composite current collector for an energy storage device electrode, which current collector has a carbon nanotube-containing electrically conductive bonding layer with excellent adhesion to the current-collecting substrate, and to provide an electrode constructed with such a composite current collector.

Means for Solving the Problems

The inventors have conducted extensive investigations in order to achieve the above objects. As a result, they have discovered that, by using a CNT dispersant having a specific structure, the CNTs within the layer disperse well and an electrically conductive bonding layer having a high adhesion to the current-collecting substrate can be obtained.

Accordingly, the invention provides:

1. A composite current collector for an energy storage device electrode, characterized by comprising a current-collecting substrate and, an electrically conductive bonding layer formed on the substrate comprising a highly branched polymer having repeating units of formula (1) or formula (2) below and carbon nanotubes

[Chemical Formula 1]

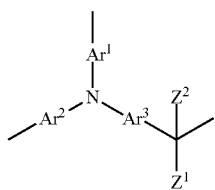
(1)

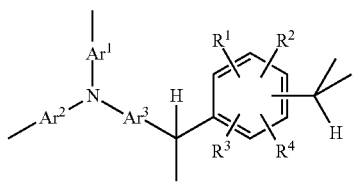
(2)

(wherein $Ar^1$ to $Ar^3$ are each independently a divalent organic group of any one of formulas (3) to (7) below

[Chemical Formula 2]

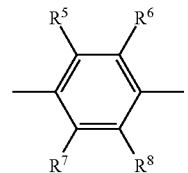
(3)

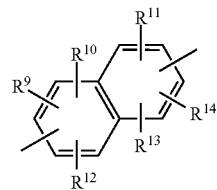
(4)

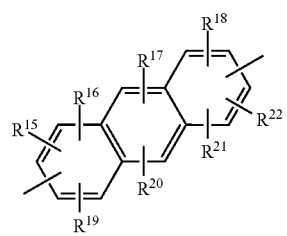
(5)

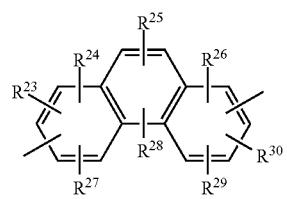
(6)

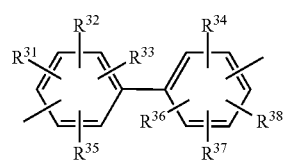
(7)

(in which $R^5$ to $R^{38}$ are each independently a hydrogen atom, a halogen atom, an alkyl group of 1 to 5 carbons which may have a branched structure, an alkoxy group of 1 to 5 carbons which may have a branched structure, or a carboxyl group, sulfo group, phosphoric acid group, phosphonic acid group or salt of any thereof); $Z^1$ and $Z^2$ are each independently a hydrogen atom, an alkyl group of 1 to 5 carbons which may have a branched structure, or a monovalent organic group of any one of formulas (8) to (11) below

[Chemical Formula 3]

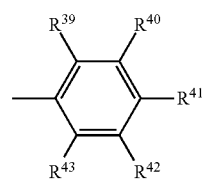
(8)

-continued

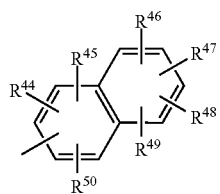
(9)

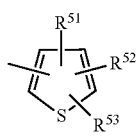
(10)

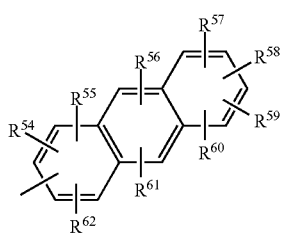
(11)

(in which $R^{39}$ to $R^{62}$ are each independently a hydrogen atom, a halogen atom, an alkyl group of 1 to 5 carbons which may have a branched structure, a haloalkyl group of 1 to 5 carbons which may have a branched structure, a phenyl group, $OR^{63}$, $COR^{63}$, $NR^{63}R^{64}$, $COOR^{65}$ ($R^{63}$ and $R^{64}$ being each independently a hydrogen atom, an alkyl group of 1 to 5 carbons which may have a branched structure, a haloalkyl group of 1 to 5 carbons which may have a branched structure, or a phenyl group; and $R^{65}$ being an alkyl group of 1 to 5 carbons which may have a branched structure, a haloalkyl group of 1 to 5 carbons which may have a branched structure, or a phenyl group), or a carboxyl group, sulfo group, phosphoric acid group, phosphonic acid group or salt of any thereof)), with the proviso that $Z^1$ and $Z^2$ are not both alkyl groups at the same time; and $R^1$ to $R^4$ in formula (2) are each independently a hydrogen atom, a halogen atom, an alkyl group of 1 to 5 carbons which may have a branched structure, an alkoxy group of 1 to 5 carbons which may have a branched structure, or a carboxyl group, sulfo group, phosphoric acid group, phosphonic acid group or salt of any thereof);

2. The composite current collector for an energy storage device electrode according to 1 above, wherein the highly branched polymer has at least one type of acidic group selected from among carboxyl, sulfo, phosphoric acid and phosphonic acid groups and salts thereof on at least one aromatic ring of the repeating units of formula (1) or (2);

3. The composite current collector for an energy storage device electrode according to 1 or 2 above, wherein the acidic group is a sulfo group or a salt thereof;

4. The composite current collector for an energy storage device electrode according to any one of 1 to 3 above, wherein the highly branched polymer has repeating units of formula (12) below

[Chemical Formula 4]

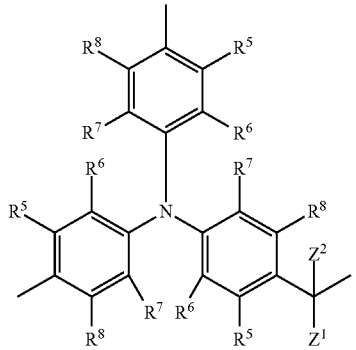
(12)

(wherein $R^5$ to $R^8$ are hydrogen atoms, carboxyl groups, sulfo groups, phosphoric acid groups, phosphonic acid groups, or salts thereof; and $Z^1$ and $Z^2$ are as defined above);

5. The composite current collector for an energy storage device electrode according to 4 above, wherein $R^5$ to $R^8$ are all hydrogen atoms;

6. The composite current collector for an energy storage device electrode according to any one of 1 to 5 above, wherein $Z^2$ is a hydrogen atom;

7. The composite current collector for an energy storage device electrode according to 6 above, wherein $Z^1$ is a hydrogen atom, a thienyl group, or a monovalent organic group of formula (8);

8. The composite current collector for an energy storage device electrode according to 4 above, wherein the highly branched polymer has repeating units of formula (13) or formula (14) below

[Chemical Formula 5]

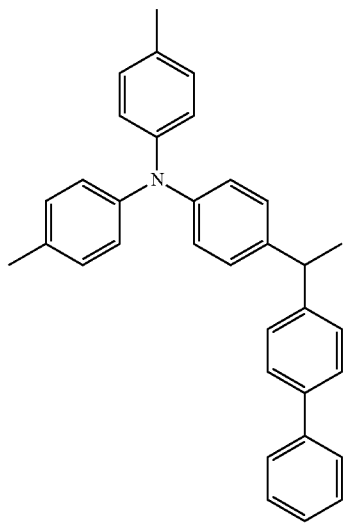
(13)

-continued (14)

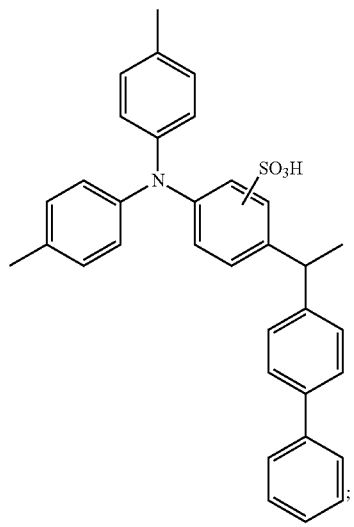

9. The composite current collector for an energy storage device electrode according to any one of 1 to 8 above, wherein the electrically conductive bonding layer further comprises a matrix polymer;

10. The composite current collector for an energy storage device electrode according to any one of 1 to 9 above, wherein the electrically conductive bonding layer has a thickness of from 0.05 to 10 μm;

11. The composite current collector for an energy storage device electrode according to any one of 1 to 10 above, wherein the current-collecting substrate is made of at least one selected from among copper, aluminum, nickel, gold, silver, and alloys thereof, and has a thickness of from 1 to 100 μm;

12. The composite current collector for an energy storage device electrode according to any one of 1 to 11 above, wherein the electrically conductive bonding layer is formed by applying a dispersion containing the highly branched polymer and carbon nanotubes, and optionally containing a matrix polymer and also an organic solvent and/or water, onto the current-collecting substrate using an inkjet, casting, dip coating, bar coating, blade coating, roll coating, gravure coating, flexographic printing, slit dye coating or spray coating method, and drying the applied dispersion;

13. An electrode for an energy storage device, characterized by comprising the composite current collector for an energy storage device electrode according to any one of 1 to 12 above, and an active material layer formed on the electrically conductive bonding layer of the composite current collector;

14. A secondary battery which includes the electrode for an energy storage device according to 13 above;

15. A capacitor which includes the electrode for an energy storage device according to 13 above;

16. An electrically conductive bonding layer-forming composition characterized by including a highly branched polymer having repeating units of formula (1) or formula (2) below and carbon nanotubes

[Chemical Formula 6]

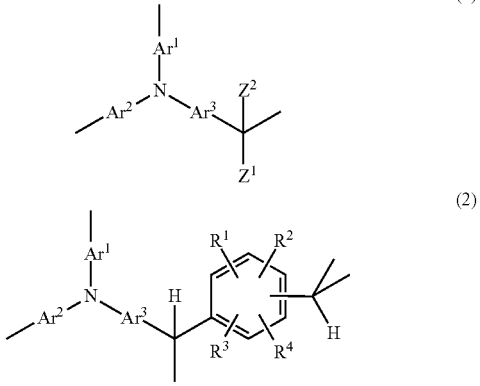

(wherein $Ar^1$ to $Ar^3$ are each independently a divalent organic group of any one of formulas (3) to (7) below

[Chemical Formula 7]

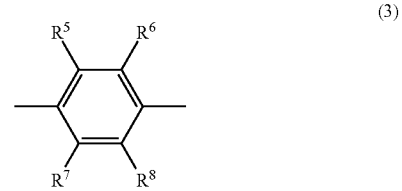

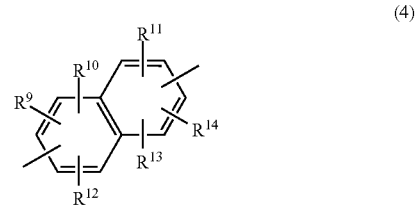

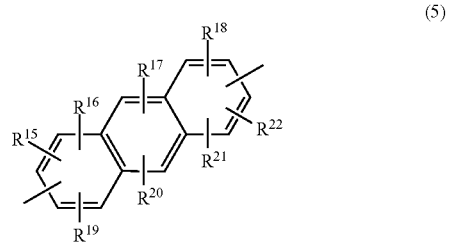

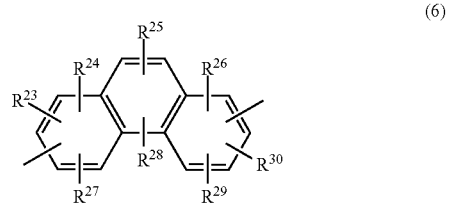

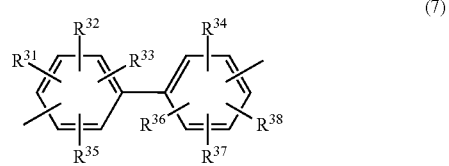

(in which $R^5$ to $R^{38}$ are each independently a hydrogen atom, a halogen atom, an alkyl group of 1 to 5 carbons which may have a branched structure, an alkoxy group of 1 to 5 carbons which may have a branched structure, or a carboxyl group, sulfo group, phosphoric acid group, phosphonic acid group or salt of any thereof); $Z^1$ and $Z^2$ are each independently a hydrogen atom, an alkyl group of 1 to 5 carbons which may have a branched structure, or a monovalent organic group of any one of formulas (8) to (11) below

[Chemical Formula 8]

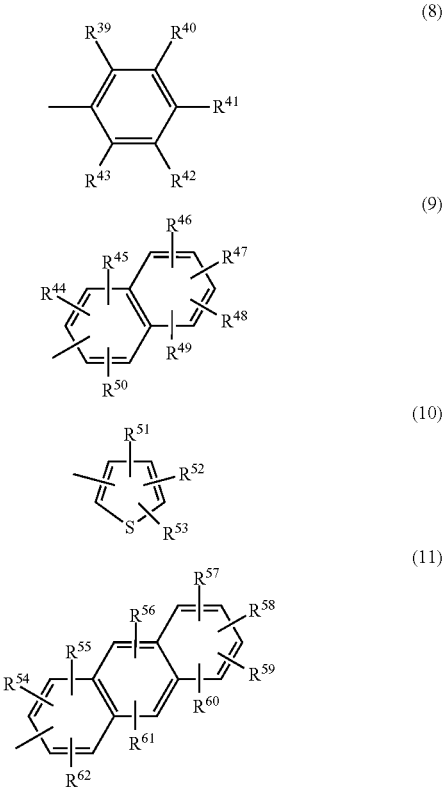

(in which $R^{39}$ to $R^{62}$ are each independently a hydrogen atom, a halogen atom, an alkyl group of 1 to 5 carbons which may have a branched structure, a haloalkyl group of 1 to 5 carbons which may have a branched structure, a phenyl group, $OR^{63}$, $COR^{63}$, $NR^{63}R^{64}$, $COOR^{65}$ ($R^{63}$ and $R^{64}$ being each independently a hydrogen atom, an alkyl group of 1 to 5 carbons which may have a branched structure, a haloalkyl group of 1 to 5 carbons which may have a branched structure, or a phenyl group; and $R^{65}$ being an alkyl group of 1 to 5 carbons which may have a branched structure, a haloalkyl group of 1 to 5 carbons which may have a branched structure, or a phenyl group), or a carboxyl group, sulfo group, phosphoric acid group, phosphonic acid group or salt of any thereof)), with the proviso that $Z^1$ and $Z^2$ are not both alkyl groups at the same time; and $R^1$ to $R^4$ in formula (2) are each independently a hydrogen atom, a halogen atom, an alkyl group of 1 to 5 carbons which may have a branched structure, an alkoxy group of 1 to 5 carbons which may have a branched structure, or a carboxyl group, sulfo group, phosphoric acid group, phosphonic acid group or salt of any thereof); and 17. The electrically conductive bonding layer-forming composition according to 16 above which further includes a matrix polymer.

Advantageous Effects of the Invention

According to the invention, because the dispersant itself has a high adhesion to the current-collecting substrate, an electrically conductive bonding layer with a high CNT concentration can be obtained. This means that the electrical resistance of the conductive bonding layer can be lowered, making it possible, particularly in applications such as electrical vehicle applications where a large current is instantaneously required, to extract current without causing a voltage drop, and at the same time enabling the production of secondary batteries having a long cycle life.

BRIEF DESCRIPTION OF THE DIAGRAMS

EMBODIMENT FOR CARRYING OUT THE INVENTION

Figure 1:
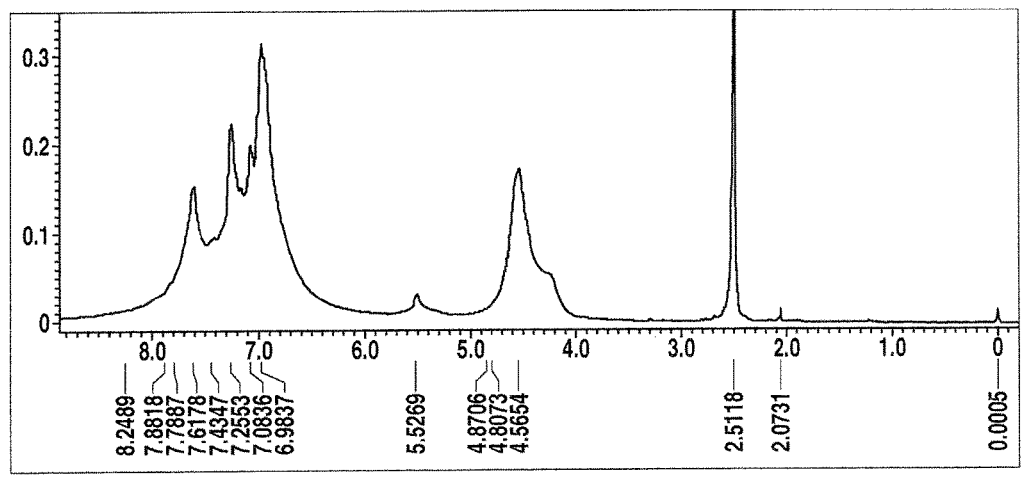
FIG. 1 is a 1H-NMR spectrum of the PTPA-PBA-SO$_3$H obtained in Synthesis Example 2.

The invention is described more fully below.

The composite current collector for an energy storage device electrode according to the invention is provided with a current-collecting substrate and, an electrically conductive bonding layer formed on the substrate containing a highly branched polymer having repeating units of above formula (1) or formula (2) and carbon nanotubes.

In this invention, the energy storage device is exemplified by various kinds of energy storage devices, including electrical double-layer capacitors, lithium secondary batteries, lithium ion secondary batteries, proton polymer batteries, nickel-hydrogen batteries and lead-acid storage batteries. Of these, use of the invention in electrical double-layer capacitors and lithium ion secondary batteries is preferred.

The highly branched polymers shown in above formulas (1) and (2) are polymers containing triarylamine structures as the branch points. More specifically, they are polymers obtained by the condensation polymerization of triarylamines with aldehydes and/or ketones under acidic conditions.

These highly branched polymers, because they appear to exhibit a high affinity to the conjugated structure of CNTs via π-π interactions originating in the aromatic rings of the triarylamine structures, are expected to have a high ability to disperse CNTs. In addition, they have such characteristics as the potential, depending on the combination of the above triarylamines with the comonomer(s) selected from among aldehydes and/or ketones and on the conditions of polymer synthesis, for the design of various skeletons, the introduction of functional groups, the control of molecular weight and distribution, and the conferring of functionality. Moreover, these highly branched polymers have a branched structure and are thus endowed with a high solubility not observed in linear polymers, and they also have an excellent heat stability.

The average molecular weight of the highly branched polymer is not particularly limited, although the weight-average molecular weight is preferably from 1,000 to 2,000,000. If the polymer has a weight-average molecular weight below 1,000, there is a chance that its ability to disperse CNTs will markedly decrease or that such an ability may cease to be exhibited. On the other hand, at a weight-average molecular weight greater than 2,000,000, handling of the polymer in dispersion treatment may become very difficult. A polymer having a weight-average molecular weight of from 2,000 to 1,000,000 is more preferred.

The weight-average molecular weight of the invention is a measured value (polystyrene equivalent) obtained by gel permeation chromatography.

In above formulas (1) and (2), $Ar^1$ to $Ar^3$ are each independently a divalent organic group of any one of above formulas (3) to (7). A substituted or unsubstituted phenylene group of formula (3) is especially preferred.

In above formulas (2) to (7), $R^1$ to $R^{38}$ are each independently a hydrogen atom, a halogen atom, an alkyl group of 1 to 5 carbons which may have a branched structure, an alkoxy group of 1 to 5 carbons which may have a branched structure, a carboxyl, sulfo, phosphoric acid or phosphonic acid group, or a salt thereof.

Here, examples of the halogen atom include fluorine, chlorine, bromine and iodine atoms.

Examples of the alkyl group of 1 to 5 carbons which may have a branched structure include methyl, ethyl, n-propyl, isopropyl, n-butyl, sec-butyl, tert-butyl and n-pentyl.

Examples of the alkoxy group of 1 to 5 carbons which may have a branched structure include methoxy, ethoxy, n-propoxy, isopropoxy, n-butoxy, sec-butoxy, tert-butoxy and n-pentoxy.

Examples of the salts of carboxyl, sulfo, phosphoric acid and phosphonic acid groups include the sodium, potassium and other alkali metal salts; the magnesium, calcium and other group 2 metal salts; ammonium salts; salts of aliphatic amines such as propylamine, dimethylamine, triethylamine and ethylenediamine; salts of alicyclic amines such as imidazoline, piperazine and morpholine; salts of aromatic amines such as aniline and diphenylamine; and pyridinium salts.

In formulas (1) and (2), $Z^1$ and $Z^2$ are each independently a hydrogen atom, an alkyl group of 1 to 5 carbons which may have a branched structure, or a monovalent organic group of any of above formulas (8) to (11), provided that $Z^1$ and $Z^2$ are not both alkyl groups at the same time. It is preferable for $Z^1$ and $Z^2$ to be each independently a hydrogen atom, a 2- or 3-thienyl group, or a group of formula (8) above. It is more preferable for one of $Z^1$ and $Z^2$ to be a hydrogen atom and for the other to be a hydrogen atom, a 2- or 3-thienyl group or a group of formula (8) above, with one in which $R^{41}$ is a phenyl group or one in which $R^{41}$ is a methoxy group being especially preferred.

When $R^{41}$ is a phenyl group, in cases where, in the subsequently described acidic group introduction method, acidic groups are introduced onto the polymer following polymer synthesis, the acidic groups are sometimes introduced onto the phenyl group.

The alkyl group of 1 to 5 carbons which may have a branched structure is exemplified by the same groups as mentioned above.

In above formulas (8) to (11), $R^{39}$ to $R^{62}$ are each independently a hydrogen atom, a halogen atom, an alkyl group of 1 to 5 carbons which may have a branched structure, a haloalkyl group of 1 to 5 carbons which may have a branched structure, a phenyl group, $OR^{63}$, $COR^{63}$, $NR^{63}R^{64}$, $COOR^{65}$ ($R^{63}$ and $R^{64}$ being each independently a hydrogen atom, an alkyl group of 1 to 5 carbons which may have a branched structure, a haloalkyl group of 1 to 5 carbons which may have a branched structure, or a phenyl group; and $R^{65}$ being an alkyl group of 1 to 5 carbons which may have a branched structure, a haloalkyl group of 1 to 5 carbons which may have a branched structure, or a phenyl group), or a carboxyl, sulfo, phosphoric acid or phosphonic acid group, or a salt thereof.

Here, the haloalkyl group of 1 to 5 carbons which may have a branched structure is exemplified by difluoromethyl, trifluoromethyl, bromodifluoromethyl, 2-chloroethyl, 2-bromoethyl, 1,1-difluoroethyl, 2,2,2-trifluoroethyl, 1,1,2,2-tetrafluoroethyl, 2-chloro-1-1-2-trifluoroethyl, pentafluoroethyl, 3-bromopropyl, 2,2,3,3-tetrafluoropropyl, 1,1,2,3,3,3-hexafluoropropyl, 1,1,1,3,3,3-hexafluoropropan-2-yl, 3-bromo-2-methylpropyl, 4-bromobutyl and perfluoropentyl.

The halogen atom and the alkyl group of 1 to 5 carbons which may have a branched structure are exemplified by the same groups as mentioned for above formulas (2) to (7).

In particular, to further improve adhesion to the current conducting substrate, the highly branched polymer used in this invention is preferably one having, on at least one aromatic ring of repeating units of formula (1) or formula (2), at least one type of acidic group selected from among carboxyl, sulfo, phosphoric acid and phosphonic acid groups and salts thereof.

Illustrative examples of aldehyde compounds which may be used to produce the highly branched polymer include saturated aliphatic aldehydes such as formaldehyde, p-formaldehyde, acetaldehyde, propionaldehyde, butyraldehyde, isobutyraldehyde, valeraldehyde, capronaldehyde, 2-methylbutyraldehyde, hexylaldehyde, undecylaldehyde, 7-methoxy-3,7-dimethyloctylaldehyde, cyclohexanecarboxaldehyde, 3-methyl-2-butyraldehyde, glyoxal, malonaldehyde, succinaldehyde, glutaraldehyde and adipaldehyde; unsaturated aliphatic aldehydes such as acrolein and methacrolein; heterocyclic aldehydes such as furfural, pyridine aldehyde and thiophene aldehyde; aromatic aldehydes such as benzaldehyde, tolylaldehyde, trifluoromethylbenzaldehyde, phenylbenzaldehyde, salicylaldehyde, anisaldehyde, acetoxybenzaldehyde, terephthaldehyde, acetylbenzaldehyde, formylbenzoic acid, methyl formylbenzoate, aminobenzaldehyde, N,N-dimethylaminobenzaldehyde, N,N-diphenylaminobenzaldehyde, naphthaldehyde, anthraldehyde and phenanthraldehyde; and aralkyl aldehydes such as phenylacetaldehyde and 3-phenylpropionaldehyde. The use of an aromatic aldehyde is especially preferred.

Ketone compounds which may be used to produce the highly branched polymer are exemplified by alkyl aryl ketones and diaryl ketones, illustrative examples of which include acetophenone, propiophenone, diphenyl ketone, phenyl naphthyl ketone, dinaphthyl ketone, phenyl tolyl ketone and ditolyl ketone.

The highly branched polymer used in the invention is obtained, as shown in Scheme 1 below, by the condensation polymerization of a triarylamine compound, such as one of formula (A) below that is capable of furnishing the aforementioned triarylamine skeleton, with an aldehyde compound and/or a ketone compound, such as one of formula (B), below in the presence of an acid catalyst.

In cases where a difunctional compound (C) such as a phthaldehyde (e.g., terephthaldehyde) is used as the aldehyde compound, not only does the reaction shown in Scheme 1 arise, the reaction shown in Scheme 2 below also arises, giving a highly branched polymer having a crosslinked structure in which the two functional groups both contribute to the condensation reaction.

Scheme 1

[Chemical Formula 9]

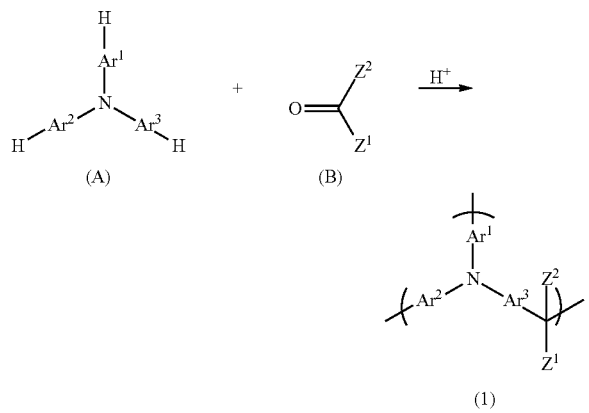

(wherein Ar$^1$ to Ar$^3$ and both Z$^1$ and Z$^2$ are the same as defined above)

Scheme 2

[Chemical Formula 10]

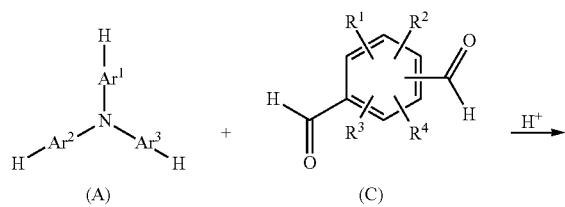

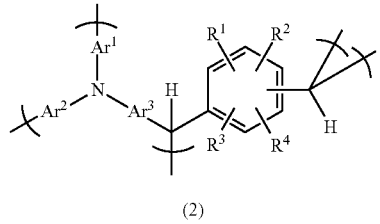

(wherein Ar$^1$ to Ar$^3$ and R$^1$ to R$^4$ are the same as defined above)

In the condensation polymerization reaction, the aldehyde compound and/or ketone compound may be used in a ratio of from 0.1 to 10 equivalents per equivalent of aryl groups on the triarylamine compound.

The acid catalyst used may be, for example, a mineral acid such as sulfuric acid, phosphoric acid or perchloric acid; an organic sulfonic acid such as p-toluenesulfonic acid or p-toluenesulfonic acid monohydrate; or a carboxylic acid such as formic acid or oxalic acid.

The amount of acid catalyst used, although variously selected according to the type thereof, is generally from 0.001 to 10,000 parts by weight, preferably from 0.01 to 1,000 parts by weight, and more preferably from 0.1 to 100 parts by weight, per 100 parts by weight of the triarylamine.

The condensation reaction may be carried out without a solvent, although it is generally carried out using a solvent. Any solvent that does not hinder the reaction may be used for this purpose. Illustrative examples include cyclic ethers such as tetrahydrofuran and 1,4-dioxane; amides such as N,N-dimethylformamide (DMF), N,N-dimethylacetamide (DMAc) and N-methyl-2-pyrrolidone (NMP); ketones such as methyl isobutyl ketone and cyclohexanone; halogenated hydrocarbons such as methylene chloride, chloroform, 1,2-dichloroethane and chlorobenzene; and aromatic hydrocarbons such as benzene, toluene and xylene. These solvents may be used singly, or two or more may be used in admixture. Cyclic ethers are especially preferred.

If the acid catalyst used is a liquid compound such as formic acid, the acid catalyst may also fulfill the role of a solvent.

The reaction temperature during condensation is generally from 40 to 200° C. The reaction time may be variously selected according to the reaction temperature, but is generally from about 30 minutes to about 50 hours.

The weight-average molecular weight Mw of the polymer obtained as described above is generally from 1,000 to 2,000,000, and preferably from 2,000 to 1,000,000.

When acidic groups are introduced onto the highly branched polymer, this may be done by a method that involves first introducing the acidic groups onto aromatic rings of the above triarylamine compound, aldehyde compound and ketone compound serving as the polymer starting materials, then using this to synthesize the highly branched polymer; or by a method that involves treating the highly branched polymer obtained with a reagent that is capable of introducing acidic groups onto the aromatic rings. From the standpoint of ease and convenience of production, use of the latter approach is preferred.

In the latter approach, the technique used to introduce acidic groups onto the aromatic rings is not particularly limited, and may be suitably selected from among various known methods according to the type of acidic group.

For example, in cases where sulfo groups are introduced, an approach that involves sulfonation using an excess amount of sulfuric acid may be used.

The CNTs used together with the highly branched polymer described above (CNT dispersant) are generally produced by, for example, an arc discharge process, chemical vapor deposition (CVD) or laser ablation. The CNTs used in this invention may be obtained by any of these methods. CNTs are categorized as single-walled CNTs composed of a single cylindrically rolled graphene sheet (abbreviated below as "SWCNTs"), double-walled CNTs composed of two concentrically rolled graphene sheets (abbreviated below as "DWCNTs"), and multi-walled CNTs composed of a plurality of concentrically rolled graphite sheets (abbreviated below as "MWCNTs"). In this invention, SWCNTs, DWCNTs and MWCNTs may each be used alone or a plurality of these types of CNTs may be used in combination.

When synthesizing SWCNTs, DWCNTs and MWCNTs by the above methods, fullerene, graphite and amorphous carbon form at the same time as by-products, in addition to which catalyst metals such as nickel, iron, cobalt and yttrium remain present. Hence, the removal of these impurities and purification is sometimes necessary. Acid treatment with nitric acid, sulfuric acid or the like in combination with ultrasonication is effective for removing impurities. In acid treatment with nitric acid, sulfuric acid or the like, the π conjugated system making up the CNTs may be destroyed, resulting in a loss of the inherent properties of the CNTs. It is thus desirable to purify and use the CNTs under suitable conditions.

The conductive bonding layer provided in the composite current collector of the invention may be produced from a conductive bonding layer-forming composition containing the above highly branched polymer and CNTs.

In this case, the conductive bonding layer-forming composition may additionally include an organic solvent having the ability to dissolve the highly branched polymer.

Illustrative examples of such organic solvents include ethers such as tetrahydrofuran (THF), diethyl ether and 1,2-dimethoxyethane (DME); halogenated hydrocarbons such as methylene chloride, chloroform and 1,2-dichloroethane; amides such as N,N-dimethylformamide (DMF), N,N-dimethylacetamide (DMAc) and N-methyl-2-pyrrolidone (NMP); ketones such as acetone, methyl ethyl ketone, methyl isobutyl ketone and cyclohexanone; alcohols such as methanol, ethanol, isopropanol and n-propanol; aliphatic hydrocarbons such as n-heptane, n-hexane and cyclohexane; aromatic hydrocarbons such as benzene, toluene, xylene and ethylbenzene; glycol ethers such as ethylene glycol monoethyl ether, ethylene glycol monobutyl ether and propylene glycol monomethyl ether; and glycols such as ethylene glycol and propylene glycol. These organic solvents may be used singly or two or more may be used in admixture.

In particular, from the standpoint of enabling the proportion of individually dispersed CNTs to be increased, the use of NMP, DMF, THF, methanol or isopropanol is preferred. In addition, depending on the solvent used, it is desirable to include also, as an additive for enhancing the film formability of the composition, a small amount of, for example, a glycol ether (e.g., ethylene glycol monoethyl ether, ethylene glycol monobutyl ether, propylene glycol monomethyl ether), a ketone (e.g., acetone, methyl ethyl ketone, cyclohexanone), propylene glycol, isopropanol or NMP.

When the above highly branched polymer is used, the dispersibility and film-forming properties are good even in cases where a hydrophilic solvent such as an alcohol, a glycol or a glycol ether is used.

Moreover, even when such a hydrophilic solvent is used as a mixed solvent with water, there is no decline in the dispersibility and the film-forming properties.

Any suitable method may be used to prepare the conductive layer-forming composition. When the highly branched polymer (dispersant) is a liquid, the composition may be prepared by suitably mixing the highly branched polymer with the CNTs. When the highly branched polymer is a solid, the composition may be prepared by melting the polymer, then mixing it with the CNTs.

In cases where a solvent is used, the composition may be prepared by mixing together the highly branched polymer, the CNTs and the solvent in any order.

The mixture of the highly branched polymer, the CNTs and the solvent is preferably subjected to dispersion treatment; with such treatment, the proportion of individually dispersed CNTs can be increased. Examples of dispersion treatment include the following types of mechanical treatment: wet treatment using a ball mill, bead mill or jet mill, and ultrasonic treatment using a bath-type or probe-type sonicator.

Any dispersion treatment time may be used, although a time of from about 1 minute to about 10 hours is preferred, and a time of from about 5 minutes to about 5 hours is more preferred.

Because the highly branched polymer used in this invention has an excellent ability to disperse CNTs, even if heat treatment is not carried out prior to dispersion treatment, it is possible to obtain a composition in which the CNTs have been individually dispersed to a high concentration. However, heat treatment may be carried out if necessary.

The mixing ratio of the highly branched polymer and the CNTs in the conductive layer-forming composition may be set to from about 1,000:1 to about 1:100, by weight.

The concentration of the highly branched polymer in a composition that uses a solvent is not particularly limited, provided it is a concentration that is able to disperse the CNTs in the solvent. In this invention, the concentration of the highly branched polymer in the composition is set to preferably from about 0.001 to about 30 wt %, and more preferably from about 0.002 to about 20 wt %.

In addition, the CNT concentration in this composition is not particularly limited, provided at least some of the CNTs are individually dispersed. However, in this invention, the CNT concentration in the composition is set to preferably from about 0.0001 to about 20 wt %, and more preferably from about 0.001 to about 10 wt %, of the composition.

In the conductive bonding layer-forming composition prepared as described above, it is presumed that the dispersant sticks to the surfaces of the CNTs to form a composite.

In addition, a matrix polymer may be added to the conductive bonding layer-forming composition. The compounding ratio thereof, although not particularly limited, is preferably set to from about 0.0001 to about 99 wt %, and more preferably from about 0.001 to about 90 wt %, of the composition.

A known binder used in electrodes for energy storage devices may be used as the matrix polymer. Illustrative examples include electrically conductive polymers such as polyvinylidene fluoride (PVdF), polytetrafluoroethylene, tetrafluoroethylene-hexafluoropropylene copolymers, vinylidene fluoride-hexafluoropropylene copolymers (P(VDF-HFP)), vinylidene fluoride-chlorotrifluoroethylene copolymers (P(VDF-CTFE)), polyvinyl alcohol, polyimide, ethylene-propylene-diene ternary copolymers, styrene-butadiene rubber, carboxymethyl cellulose (CMC), polyacrylic acid (PAA) and polyaniline. Aside from the above, additional examples include the following thermoplastic resins: polyolefin resins such as polyethylene (PE), polypropylene (PP), ethylene-vinyl acetate copolymers (EVA) and ethylene-ethyl acrylate copolymers (EEA), polystyrene resins such as polystyrene (PS), high-impact polystyrene (HIPS), acrylonitrile-styrene copolymers (AS), acrylonitrile-butadiene-styrene copolymers (ABS) and methyl methacrylate-styrene copolymers (MS), polycarbonate resins, vinyl chloride resins, polyamide resins, polyurethane resins, (meth) acrylic resins such as polymethyl methacrylate (PMMA), polyester resins such as polyethylene terephthalate (PET), polybutylene terephthalate, polyethylene naphthalate, polybutylene naphthalate, polylactic acid (PLA), poly-3-hydroxybutyric acid, polycaprolactone, polybutylene succinate and polyethylene succinate/adipate, polyphenylene ether resins, modified polyphenylene ether resins, polyacetal resins, polysulfone resins, polyphenylene sulfide resins, polyvinyl alcohol resins, polyglycolic acids, modified starches, cellulose acetate and cellulose triacetate, chitin and chitosan, and lignin; the following electrically conductive polymers: polyaniline, emeraldine base (the semi-oxidized form of polyaniline), polythiophene, polypyrrole, polyphenylene vinylene, polyphenylene and polyacetylene; and the following thermoset or photocurable resins: epoxy resins, urethane acrylate, phenolic resins, melamine resins, urea resins and alkyd resins. A curing agent which is capable of curing these matrix resins may also be included.

In this case, preparation of the composition should involve subjecting the dispersant, CNTs, matrix polymer and, if necessary, a solvent to mixing with a mixing apparatus or kneading apparatus, to form a composite thereof. Examples of the mixing apparatus or kneading apparatus include various types of mixers and single-screw or twin-screw extruders. The mixing/kneading temperature and time are not particularly limited, and are suitably selected according to the matrix polymer and the solvent.

The CNT concentration in a composition where a matrix polymer has been used varies depending on the mechanical, electrical, thermal and other characteristics desired of the thin film (bonding layer), and thus is not particularly limited. However, in this invention, the CNT concentration in the composition is set to preferably from about 0.0001 to about 30 wt %, and more preferably from about 0.001 to about 20 wt %.

The conductive bonding layer-forming composition may also include a crosslinking agent that can react to crosslink with the highly branched polymer and is soluble in the above solvent.

Examples of such crosslinking agents include melamine-based crosslinking agents, substituted urea-based crosslinking agents, and crosslinking agents which are polymers thereof. These crosslinking agents may be used singly, or two or more may be used in admixture. A crosslinking agent having at least two crosslink-forming substituents is preferred. Illustrative examples of such crosslinking agents include compounds such as CYMEL®, methoxymethylated glycoluril, butoxymethylated glycoluril, methylolated glycoluril, methoxymethylated melamine, butoxymethylated melamine, methylolated melamine, methoxymethylated benzoguanamine, butoxymethylated benzoguanamine, methylolated benzoguanamine, methoxymethylated urea, butoxymethylated urea, methylolated urea, methoxymethylated thiourea, methoxymethylated thiourea and methylolated thiourea, as well as condensates of these compounds.

The amount of crosslinking agent added varies according to such factors as the organic solvent used, the base material used, the required viscosity, and the required film shape. However, the amount of addition with respect to the highly branched polymer is typically from 0.001 to 80 wt %, preferably from 0.01 to 50 wt %, and more preferably from 0.05 to 40 wt %. Although these crosslinking agents do sometimes give rise to crosslinking reactions due to self-condensation, they can react to crosslink with the highly branched polymer. In cases where crosslinkable substituents are present in the highly branched polymer, the crosslinking reaction is promoted by these crosslinkable substituents.

In this invention, an acidic compound (e.g., p-toluenesulfonic acid, trifluoromethanesulfonic acid, pyridinium p-toluenesulfonic acid, salicylic acid, sulfosalicylic acid, citric acid, benzoic acid, hydroxybenzoic acid, naphthalenecarboxylic acid) and/or a thermal acid generator (e.g., 2,4,4,6-tetrabromocyclohexadienone, benzoin tosylate, 2-nitrobenzyl tosylate, alkyl esters of organic sulfonic acids) may be added as a catalyst for promoting the crosslinking reaction.

The amount of catalyst addition with respect to the CNT dispersant (highly branched polymer) is typically from 0.0001 to 20 wt %, preferably from 0.0005 to 10 wt %, and more preferably from 0.001 to 3 wt %.

The viscosity of the conductive bonding layer-forming composition of the invention is suitably selected according to the method of application to be used. For example, in cases where an inkjet, casting, dip coating, bar coating, gravure coating, flexographic printing or spray coating method is to be used, a viscosity of from about 1 to about 1,000 mPa·s is suitable. In cases where a blade coating, roll coating, slit die coating or screen printing method is to be used, a viscosity of from about 100 to about 100,000 mPa·s is suitable.

The viscosity of the composition can be adjusted by changing, for example, the amounts and types of solid ingredients (CNTs, dispersant, etc.) and solvents. It is also possible to use a thickener to increase the viscosity.

Examples of such thickeners include polysaccharides such as carboxymethyl cellulose, methyl cellulose, ethyl cellulose, hydroxyethyl cellulose, hydroxypropyl cellulose, xantham gum, guar gum, sodium alginate, carrageenan, pectin and locust beam gum; proteins such as albumin and casein; synthetic polymers such as polyacrylic acid, as well as salts and crosslinked forms thereof, polyglycol compounds, polyvinyl alcohol compounds, polyether compounds, polyamide compounds and polyester compounds; and inorganic fine particles such as silica sol.

The amount of thickener added may be suitably set within the range of, based on the overall composition, generally from about 0.01 to about 20 wt %, while taking into account such considerations as the balance between the thickness of the film to be formed and the method of application.

The current-collecting substrate used may be one which is suitably selected from among those which have hitherto been used as current collectors in electrodes for energy storage devices. For example, thin films of copper, aluminum, nickel, gold, silver and alloys thereof, and also carbon materials, metal oxides, and conductive polymers may be used.

The thickness is not particularly limited, although a thickness of from 1 to 100 μm is preferred in this invention.

The composite current collector of the invention can be produced by applying the above conductive bonding layer-forming composition onto a current-collecting substrate, then drying the applied composition in air or under heating so as to form a conductive bonding layer.

In this case, the thickness of the conductive bonding layer is not particularly limited, although, taking into account the reduction of internal resistance, a thickness of from 0.05 to 10 µm is preferred.

Illustrative examples of the method of applying the composition include spin coating, dip coating, flow coating, inkjet, spray coating, bar coating, gravure coating, slit die coating, roll coating, flexographic printing, transfer printing brush coating, blade coating, air knife coating and screen printing. From the standpoint of work efficiency, inkjet, casting, dip coating, bar coating, blade coating, roll coating, gravure coating, flexographic printing, spray coating and slit die coating are preferred.

The temperature when drying under applied heat, although not particularly limited, is preferably from about 50 to about 200° C., and more preferably from about 80 to about 150° C.

The electrode of this invention can be produced by forming an active material layer on the conductive bonding layer of the above composite current collector.

The active material used here may be any of the various types of active materials that have hitherto been used in electrodes for energy storage devices.

For example, in the case of lithium secondary batteries and lithium ion secondary batteries, chalcogen compounds capable of lithium ion insertion and extraction, lithium ion-containing chalcogen compounds, polyanion compounds, elemental sulfur and sulfur compounds may be used as the positive electrode active material.

Illustrative examples of such chalcogen compounds capable of lithium ion insertion and extraction include $FeS_2$, $TiS_2$, $MoS_2$, $V_2O_6$, $V_6O_{13}$ and $MnO_2$.

Illustrative examples of lithium ion-containing chalcogen compounds include $LiCoO_2$, $LiMnO_2$, $LiMn_2O_4$, $LiMo_2O_4$, $LiV_3O_8$, $LiNiO_2$ and $Li_xNi_yM_{1-y}O_2$ (wherein M is at least one metal element selected from among cobalt, manganese, titanium, chromium, vanadium, aluminum, tin, lead and zinc; and the conditions $0.05 \leq x \leq 1.10$ and $0.5 \leq y \leq 1.0$ are satisfied).

An example of a polyanion compounds is $LiFePO_4$.

Illustrative examples of sulfur compounds include $Li_2S$ and rubeanic acid.

The following may be used as the negative electrode active material in the negative electrode: alkali metals, alkali alloys, at least one elemental substance selected from among group 4 to 15 elements of the periodic table which insert and extract lithium ions, as well as oxides, sulfides and nitrides thereof, and carbon materials which are capable of reversibly inserting and extracting lithium ions.

Illustrative examples of alkali metals include lithium, sodium and potassium. Illustrative examples of alkali metal alloys include metallic lithium, Li—Al, Li—Mg, Li—Al—Ni, sodium, Na—Hg and Na—Zn.

Illustrative examples of at least one elemental substance selected from among group 4 to 15 elements of the periodic table which insert and extract lithium ions include silicon, tin, aluminum, zinc and arsenic.

Illustrative examples of oxides include tin silicon oxide ($SnSiO_3$), lithium bismuth oxide ($Li_3BiO_4$), lithium zinc oxide ($Li_2ZnO_2$) and lithium titanium oxide ($Li_4Ti_5O_{12}$).

Illustrative examples of sulfides include lithium iron sulfides ($Li_xFeS_2$ ($0 \leq x \leq 3$)) and lithium copper sulfides ($Li_xCuS$ ($0 \leq x \leq 3$)).

Exemplary nitrides include lithium-containing transition metal nitrides, illustrative examples of which include $Li_xM_yN$ (wherein M is cobalt, nickel or copper; $0 \leq x \leq 3$, and $0 \leq y \leq 0.5$) and lithium iron nitride ($Li_3FeN_4$).

Examples of carbon materials which are capable of reversibly inserting and extracting lithium ions include graphite, carbon black, coke, glassy carbon, carbon fibers, carbon nanotubes, and sintered compacts of these.

In the case of electrical double-layer capacitors, a carbonaceous material may be used as the active material.

The carbonaceous material is exemplified by activated carbon, such as activated carbon obtained by carbonizing a phenolic resin, then subjecting the carbonized resin to activation treatment.

Aside from the above active material, a conductive additive may also be added to the electrode of the invention. Illustrative examples of conductive additives include carbon black, ketjen black, acetylene black, carbon whiskers, carbon fibers, natural graphite, synthetic graphite, titanium oxide, ruthenium oxide, aluminum and nickel.

The active material layer can be formed by applying the above-described electrode slurry containing an active material, a binder polymer and, optionally, a solvent onto the conductive bonding layer, then drying in air or under heating.

A known material may be suitably selected and used as the binder polymer. Illustrative examples of such binder polymers include electrically conductive polymers such as polyvinylidene fluoride (PVdF), polytetrafluoroethylene, tetrafluoroethylene-hexafluoropropylene copolymers, vinylidene fluoride-hexafluoropropylene copolymers (P(VDF-HFP)), vinylidene fluoride-chlorotrifluoroethylene copolymers (P(VDF-CTFE)), polyvinyl alcohol, polyimide, ethylene-propylene-diene ternary copolymers, styrene-butadiene rubbers, carboxymethyl cellulose (CMC), polyacrylic acid (PAA) and polyaniline.

The amount of binder polymer added per 100 parts by weight of the active material is preferably from 0.1 to 20 parts by weight, and more preferably from 1 to 10 parts by weight.

The solvent is exemplified by the organic solvents and water mentioned above in connection with the highly branched polymer. The solvent may be suitably selected from among these according to the type of binder, although NMP is preferred in the case of water-insoluble binders such as PVdF, and water is preferred in the case of water-soluble binders such as PAA.

The method of applying the electrode slurry is exemplified by the same techniques as mentioned above for the conductive bonding layer-forming composition.

The temperature when drying under applied heat, although not particularly limited, is preferably from about 50 to about 200° C., and more preferably from about 80 to about 150° C.

The energy storage device according to the invention is provided with the above-described electrode. More specifically, it is constructed of at least a pair of positive and negative electrodes, a separator interposed between these electrodes, and an electrolyte, with at least one of the positive and negative electrodes being the above-described electrode for an energy storage device.

Because this energy storage device is characterized by the use of the above-described energy storage device electrode as an electrode therein, the separator, electrolyte and other constituent members of the device may be suitably selected for use from among known materials.

Illustrative examples of the separator include cellulose-based separators and polyolefin-based separators.

The electrolyte may be either a liquid or a solid, and moreover may be either aqueous or non-aqueous, the energy storage device electrode of the invention being capable of exhibiting a performance sufficient for practical purposes even when employed in devices that use a non-aqueous electrolyte.

The non-aqueous electrolyte is exemplified by a non-aqueous electrolyte solution obtained by dissolving an electrolyte salt in a non-aqueous organic solvent.

Illustrative examples of the electrolyte salt include lithium salts such as lithium tetrafluoroborate, lithium hexafluorophosphate, lithium perchlorate and lithium trifluoromethanesulfonate; and quaternary ammonium salts such as tetramethylammonium hexafluorophosphate, tetraethylammonium hexafluorophosphate, tetrapropylammonium hexafluorophosphate, methyltriethylammonium hexafluorophosphate, tetraethylammonium tetrafluoroborate and tetraethylammonium perchlorate.

Illustrative examples of non-aqueous organic solvents include alkylene carbonates such as propylene carbonate, ethylene carbonate and butylene carbonate, dialkyl carbonates such as dimethyl carbonate, methyl ethyl carbonate and diethyl carbonate, nitriles such as acetonitrile, and amides such as dimethylformamide.

The composite current collector of the invention may also be used as a negative electrode in aluminum electrolytic capacitors and solid electrolytic capacitors.

EXAMPLES

Working Examples of the invention and Comparative Examples are given below by way of illustration, although the invention is not limited by the following Examples. The instruments used in the Examples were as follows.
(1) Gel Permeation Chromatography (GPC)
  Instrument: HLC-8200 GPC (Tosoh Corporation)
  Columns: Shodex KF-804L+KF-805L
  Column temperature: 40° C.
  Solvent: Tetrahydrofuran
  Detector: UV (254 nm)
  Calibration curve: Standard polystyrene
(2) Thermogravimetric/Differential Thermal Analyzer (TG-DTA)
  Instrument: TG-8120 (Rigaku Corporation)
  Temperature ramp-up rate: 10° C./min
  Measurement temperatures: 25° C. to 750° C.
(3) UV/Vis Photo-Differential Scanning calorimeter (Photo-DSC)
  Instrument: Photo-DSC 204 F1 Phoenix (from Netzsch)
  Temperature ramp-up rate: 40° C./min
  Measurement temperature: 25° C. to 350° C.
(4) $^1$H-NMR Spectrometer
  Instrument: JNM-ECA700 (from JEOL, Ltd.)
  Solvent used in measurement: DMSO-$d_6$ (deuterated dimethylsulfoxide)
  Reference material: Tetramethylsilane (0.00 ppm)
(5) $^{13}$C-NMR Spectrometer
  Instrument: JNM-ECA700 (from JEOL, Ltd.)
  Solvent used in measurement: DMSO-$d_6$
  Reference material: DMSO-$d_6$ (39.5 ppm)
(6) Ion Chromatography (quantitative analysis of sulfur)
  Instrument: ICS-1500 (Dionex)
  Columns: IonPac AG12A+IonPac AS12A (Dionex)
  Solvent: Aqueous solution containing 2.7 mmol/L of $NaHCO_3$+0.3 mmol/L of $Na_2CO_3$
  Detector: Electrical conductivity
(7) Probe-Type Ultrasonicator (dispersion treatment)
  Apparatus: UIP1000 (Hielscher Ultrasonics GmbH)
(8) Wire bar coater (thin-film production)
  Apparatus: PM-9050MC (SMT Co., Ltd.)
(9) Charge/Discharge Measurement System
  (evaluation of secondary batteries)
  Apparatus: HJ1001 SMSA (Hokuto Denko Corporation)
(10) Scanning Electron Microscope (SEM)
  (film thickness measurement)
  Apparatus: JSM-7400F (JEOL, Ltd.)
(11) Micrometer
  (measurement of binder and active layer thicknesses)
  Apparatus: IR54 (Mitutoyo Corporation)
(12) E-Type Viscometer
  (viscosity measurements of MWCNT-containing dispersions)
  Apparatus: VISCONIC ED (Tokimec Inc.)
(13) Homogenizing Disperser (mixture of electrode slurry)
  Apparatus: T.K. Robomix (with Homogenizing Disperser model 2.5 (32 mm dia.)), from Primix Corporation
(14) Thin-Film Spin-Type High-Speed Mixer
  (mixture of electrode slurry)
  Apparatus: Filmix model 40 (Primix Corporation)
(15) Planetary Centrifugal Mixer
  (deaeration of electrode slurry)
  Apparatus: Thinky Mixer ARE-310 (Thinky)
[1] Synthesis of Dispersants (Triarylamine-Based Highly Branched Polymers)

[Synthesis Example 1] Synthesis of PTPA-PBA

[Chemical Formula 11]

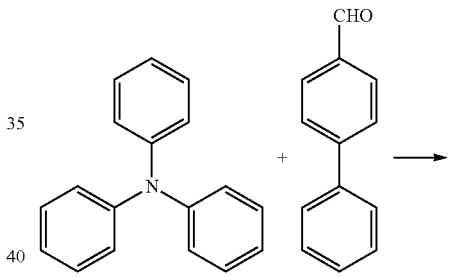

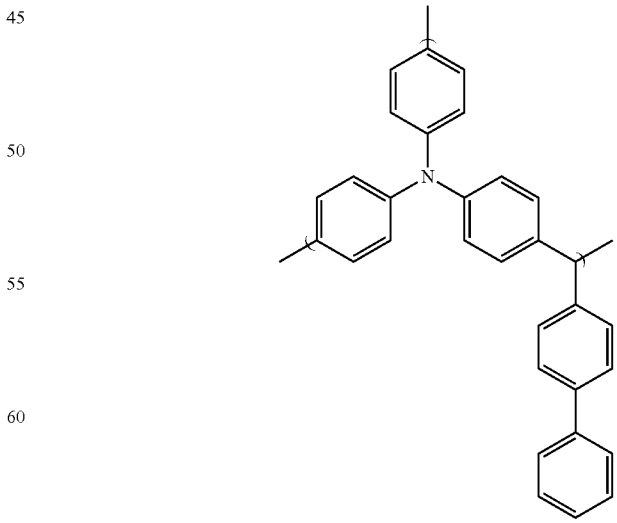

Under a nitrogen atmosphere, a 1-liter four-neck flask was charged with 80.0 g (326 mmol) of triphenylamine (Zhenjiang Haitong Chemical Industry Co., Ltd.), 118.8 g (652 mmol; 2.0 eq. relative to the triphenylamine) of 4-phenylbenzaldehyde (4-BPAL; Mitsubishi Gas Chemical), 12.4 g (65 mmol; 0.2 eq. relative to the triphenylamine) of p-toluenesulfonic acid monohydrate (Konan Chemical Manufacturing Co., Ltd.), and 160 g of 1,4-dioxane. The temperature of this mixture was raised to 85° C. under stirring, thereby effecting dissolution and commencing polymerization. The reaction was carried out for 6 hours, after which the reaction mixture was allowed to cool to 60° C. The reaction mixture was then diluted with 560 g of THF, after which 80 g of 28 wt % ammonia water was added. The resulting reaction solution was poured into a mixed solution of 2,000 g of acetone and 400 g of methanol to effect reprecipitation. The precipitate that settled out was collected by filtration and dried in vacuo. The resulting solid was re-dissolved in 640 g of THF, then poured into a mixed solution of 2,000 g of acetone and 400 g of water, thereby again effecting reprecipitation. The precipitate that settled out was collected by filtration and dried in vacuo for 6 hours at 130° C., giving 115.1 g of the highly branched polymer PTPA-PBA.

The weight-average molecular weight Mw of this PTPA-PBA, as measured by gel permeation chromatography against a polystyrene standard, was 17,000, and the polydispersity Mw/Mn was 3.82 (here, Mn represents the number-average molecular weight measured under the same conditions). The 5% weight loss temperature, as measured with a TG-DTA, was 531° C. The glass transition temperature (Tg), as measured by differential scanning calorimetry, was 159° C.

[Synthesis Example 2] Synthesis of PTPA-PBA-SO$_3$H

[Chemical Formula 12]

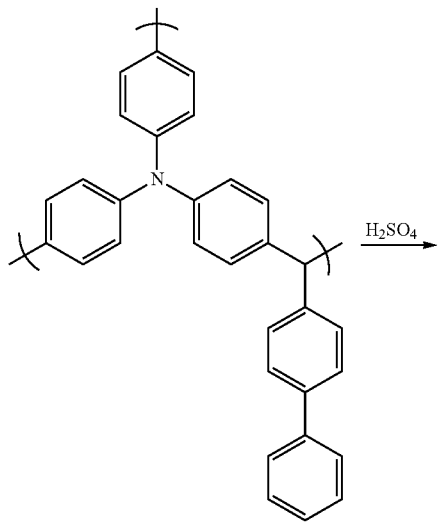

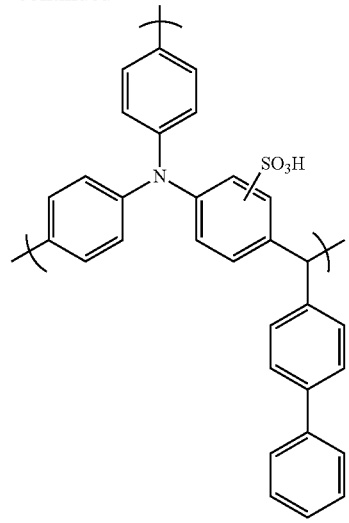

Under a nitrogen atmosphere, a 500 mL four-neck flask was charged with 2.0 g of the PTPA-PBA synthesized in Synthesis Example 1 and 50 g of sulfuric acid (Kanto Chemical Co., Ltd.). The temperature of this mixture was raised to 40° C. under stirring, thereby effecting dissolution and commencing sulfonation. After 8 hours of reaction, the temperature of the reaction mixture was raised to 50° C. and the reaction was allowed to proceed for 1 hour more. This reaction mixture was poured into 250 g of pure water to effect reprecipitation. The precipitate was collected by filtration, after which 250 g of pure water was added thereto and the precipitate was left at rest for 12 hours. The precipitate was then collected by filtration and dried in vacuo at 50° C. for 8 hours, yielding 2.7 g of the highly branched polymer PTPA-PBA-SO$_3$H (referred to below as simply "PTPA-PBA-SO$_3$H") as a purple powder.

Figure 2:
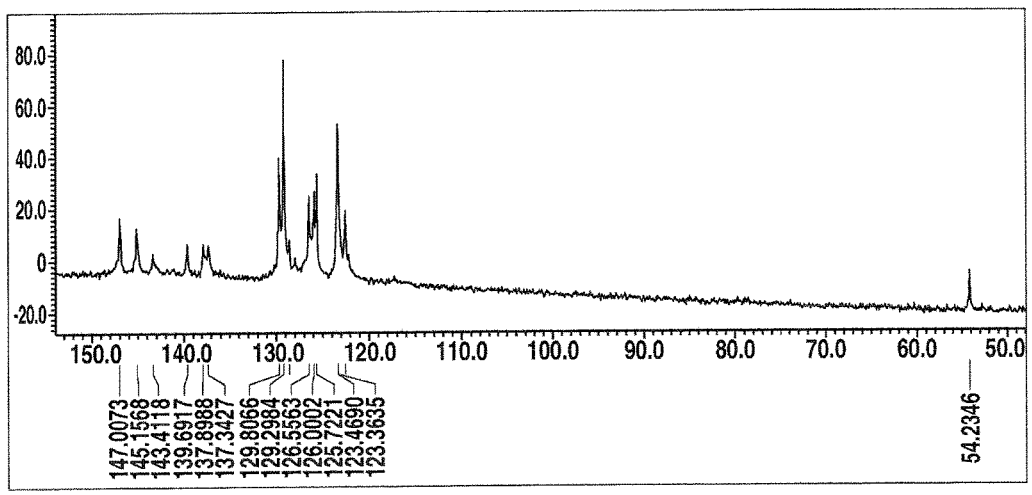
FIG. 2 is a $^{13}$C-NMR spectrum of the PTPA-PBA-SO$_3$H obtained in Synthesis Example 2.

FIG. 1 shows the $^1$H-NMR spectrum of the resulting PTPA-PBA-SO$_3$H, and FIG. 2 shows the $^{13}$C-NMR spectrum. The sulfur atom content of the PTPA-PBA-SO$_3$H, as determined by quantitative analysis of the sulfur, was 6.4 wt %. Based on this result, the sulfo group content of the PGPA-PBA-SO$_3$H was one sulfo group per repeating unit of the highly branched polymer PTPA-PBA.

[2] Production of Composite Current Collector Using a Conductive Bonding Layer-Forming Composition, and Adhesion between Conductive Bonding Layer and Current-Collecting Substrate Example 1

An amount of 0.25 g of the PTPA-PBA-SO$_3$H synthesized in Example 2 was dissolved as the dispersant in 49.50 g of methanol as the dispersion medium, and 0.25 g of MWCNTs (VGCF-X, from Showa Denko K.K.; outside diameter, 15 nm) was added to the resulting solution. This mixture was subjected to 30 minutes of ultrasonic treatment at room temperature (about 25° C.) using a probe-type ultrasonicator, thereby giving a black MWCNT-containing dispersion (conductive bonding layer-forming composition) A1 in which the MWCNTs were uniformly dispersed and which was free of precipitate.

The mixture obtained by adding 0.5 mL of methanol to 2 mL of the resulting MWCNT-containing dispersion A1 was uniformly spread with a wire bar coater (No. 12, wet film thickness, 27.4 μm) over copper foil (thickness, 20 μm) as the current-collecting substrate, following which the applied material was dried at 120° C. for 5 minutes to form a conductive bonding layer, thereby producing a composite current collector B1. This composite current collector was torn and the cross-section was examined with a scanning electron microscope, whereupon the thickness of the conductive bonding layer was found to be 300 nm.

Comparative Example 1

An amount of 0.25 g of polyvinylpyrrolidone (PVP, from Tokyo Chemical Industry Co., Ltd.; Mw, ~10,000) was dissolved as the dispersant in 49.50 g of propylene glycol (PG, from Junsei Chemical Co., Ltd.) as the dispersion medium, and 0.25 g of MWCNTs was added to the resulting solution. This mixture was subjected to 15 minutes of ultrasonic treatment at room temperature (about 25° C.) using a probe-type ultrasonicator, thereby giving a black MWCNT-containing dispersion X1 in which the MWCNTs were uniformly dispersed and which was free of precipitate.

The mixture obtained by adding 0.5 mL of PG to 2 mL of the resulting MWCNT-containing dispersion X1 was uniformly spread with a wire bar coater (No. 12, wet film thickness, 27.4 μm) over copper foil, following which the applied material was dried at 120° C. for 5 minutes to form a conductive bonding layer, thereby producing a composite current collector Y1. This composite current collector was torn and the cross-section was examined with a scanning electron microscope, whereupon the thickness of the conductive bonding layer was found to be 200 nm.

Comparative Example 2

Aside from using 49.50 g of N-methylpyrrolidone (NMP, from Junsei Chemical Co., Ltd.) instead of 49.50 g of propylene glycol as the dispersion medium, an MWCNT-containing dispersion X2 was obtained in the same way as in Comparative Example 1.

The mixture obtained by adding 0.5 mL of cyclohexanone to 2 mL of the resulting MWCNT-containing dispersion X2 was uniformly spread with a wire bar coater (No. 12, wet film thickness, 27.4 μm) over copper foil, following which the applied material was dried at 120° C. for 5 minutes to form a conductive bonding layer, thereby producing a composite current collector Y2. The composite current collector was torn and the cross-section was examined with a scanning electron microscope, whereupon the thickness of the conductive bonding layer was found to be 200 nm.

Using the respective composite current collectors B1, Y1 and Y2 produced in Example 1 and Comparative Examples 1 and 2, evaluations of the adhesion between the conductive bonding layer and the current-collecting substrate were carried out by the following procedure.

The conductive bonding layers of the composite current collectives B1, Y1 and Y2 were crosscut at intervals of 1 mm, both vertically and horizontally, and thereby cut into 100 squares. In other words, 100 square boxes, each measuring 1 mm on a side, were formed by such crosscutting. Next, pressure-sensitive adhesive tape (CT-12S2P, from Nichiban Co., Ltd.) was attached to this crosscut area, after which the tape was peeled off. Evaluations of adhesion were then carried out by assigning a rating of "Good" in cases where no peeling of the crosscut conductive bonding layer occurred, and assigning a rating of "NG" in cases where some or all of the crosscut conductive bonding layer peeled off. The evaluation results are shown in Table 1.

TABLE 1

| Composite current collector | Highly branched polymer | Dispersion medium | Adhesion |
|---|---|---|---|
| Example 1 | PTPA-PBA-SO$_3$H | MeOH | Good |
| Comparative Example 1 | PVP | PG | NG |
| Comparative Example 2 | PVP | NMP | NG |

In the peel test, the conductive bonding layer of the composite current collector B1 produced in Example 1 showed a high adhesion to the copper foil serving as the current-collecting substrate and did not peel off whatsoever. By contrast, the conductive bonding layers of the composite current collectors Y1 and Y2 produced in Comparative Examples 1 and 2 had a low adhesion to copper and peeled from the current-collecting substrate. The reason appears to be that the PTPA-PBA-SO$_3$H included as a dispersant in Dispersion A1 functions as a binder with respect to the current-collecting substrate, whereas PVP, which is a common carbon nanotube dispersant, does not have the same function.

[3] Evaluation of Adhesion Between Conductive Bonding Layer and Binder

Using the respective composite current collectors B1, Y1 and Y2 produced in Example 1 and Comparative Examples 1 and 2, evaluations of adhesion with the binder polyvinylidene fluoride (PVdF; a 12 wt NMP solution available from Kureha Corporation as KF Polymer L#1120) were carried out by the following procedure.

First, a PVdF solution was uniformly (200 μm) spread over each composite current collector by the doctor blade method and dried, first at 80° C. for 30 minutes then at 120° C. for 30 minutes, thereby forming PVdF thin-films. The thin-films formed at this time each had a thickness of 10 μm.

Following the same method as described above, cross-cutting was carried out on the binder layer and the conductive bonding layer, and evaluations of the adhesion were carried out using pressure-sensitive adhesive tape. Also, for the sake of comparison, following the same method, a PVdF thin-film was formed on the copper foil (unmodified copper foil) serving as the current-collecting substrate, and the adhesion was evaluated (Comparative Example 3). The evaluation results are shown in Table 2.

TABLE 2

| Composite current collector (current-collecting substrate) | Highly branched polymer | Dispersion medium | PVdF adhesion |
|---|---|---|---|
| Example 1 | PTPA-PBA-SO$_3$H | MeOH | Good |
| Comparative Example 1 | PVP | PG | NG |
| Comparative Example 2 | PVP | NMP | NG |
| Comparative Example 3 | — | — | NG |

In the peel test, the conductive bonding layer of the composite current collector B1 produced in Example 1 showed a high adhesion with the PVdF serving as the binder and did not peel off whatsoever. By contrast, the conductive bonding layers and unmodified copper foil in the composite current collectors Y1 and Y2 produced in Comparative Examples 1 and 2 had a low adhesion with PVdF and peeling was observed. The reason appears to be that the PTPA-PBA-SO$_3$H included as a dispersant in Dispersion A1 functions as a binder with respect to PVdF, whereas PVP, which is an ordinary carbon nanotube dispersant, does not have the same function.

[4] Production of Composite Current Collectors Using Matrix Polymer-Containing Conductive Bonding Layer-Forming Compositions Example 2

First, a matrix polymer solution was prepared by mixing together 0.6 g of polymethyl methacrylate (PMMA, from Aldrich Co.; Mw, ~120,000) and 14.4 g of NMP, then stirring at 80° C. for 1 hour to effect dissolution.

Next, 0.50 g of the PTPA-PBA synthesized in Synthesis Example 1, as the dispersant, was dissolved in 49.00 g of NMP as the dispersion medium, and 0.50 g of MWCNTs was added to the resulting solution. This mixture was subjected to 30 minutes of ultrasonic treatment at room temperature (about 25° C.) using a probe-type ultrasonicator, thereby giving a dispersion in which the MWCNTs were uniformly dispersed and which was free of precipitate.

The resulting dispersion, in an amount of 13.5 g, was mixed together with 6.8 g of the matrix polymer solution, giving a black MWCNT-containing dispersion (conductive bonding layer-forming composition) A2.

The resulting MWCNT-containing dispersion A2, 2 mL, was uniformly spread with a wire bar coater (No. 12, wet film thickness, 27.4 μm) over copper foil, following which the applied material was dried at 120° C. for 20 minutes to form a conductive bonding layer, thereby producing a composite current collector B2. The composite current collector was torn and the cross-section was examined with a scanning electron microscope, whereupon the thickness of the conductive bonding layer was found to be 700 nm.

Example 3

Aside from using aluminum foil (thickness, 20 μm) instead of copper foil, a composite current collector B3 was produced by the same method as in Example 2. The composite current collector was torn and the cross-section was examined with a scanning electron microscope, whereupon the thickness of the conductive bonding layer was found to be 650 nm.

Example 4

First, 6.2 g of the emeraldine base polyaniline (abbreviated below as "EB"; Mw, 53,000; Mn, 19,000) synthesized by the method described in Reference Example 1 of JP No. 2855206 was added to 200.0 g of NMP and 30 minutes of treatment at 5,000 rpm using a homogenizing disperser (Primix Corporation) was carried out, thereby preparing an NMP dispersion of polyaniline. In a separate procedure, an amine solution was prepared by mixing together 1.0 g of n-propylamine (Tokyo Chemical Industry Co., Ltd.) and 4.0 g of ethylene glycol monobutyl ether (EGMBE, from Tokyo Chemical Industry Co., Ltd.).

A matrix polymer solution was then prepared by mixing together 100.3 g of the above NMP dispersion, 0.2 g of the above amine solution, 1.0 g of NMP and 10.5 g of EGMBE for 1 hour with a stirrer.

Next, 18.2 g of the resulting matrix polymer solution and 18.2 g of a dispersion obtained by uniformly dispersing the MWCNT produced in Example 2 were mixed together, giving a black MWCNT-containing dispersion (conductive bonding layer-forming composition) A3.

The resulting MWCNT-containing dispersion A3, in an amount of 2 mL, was uniformly spread with a wire bar coater over copper foil, following which the applied material was dried at 120° C. for 20 minutes to form a conductive bonding layer, thereby producing a composite current collector. B4. The composite current collector was torn and the cross-section was examined with a scanning electron microscope, whereupon the thickness of the conductive bonding layer was found to be 400 nm.

Example 5

Aside from using aluminum foil instead of copper foil, a composite current collector B5 was produced by the same method as in Example 4. The composite current collector was torn and the cross-section was examined with a scanning electron microscope, whereupon the thickness of the conductive bonding layer was found to be 350 nm.

Example 6

First, a matrix polymer solution was prepared by mixing together 2.0 g of polyurethane (abbreviated below as "PU"; P22SRNAT, from Nippon Miractran Co., Ltd.) and 48.0 g of NMP, and stirring the mixture at 80° C. for 1 hour to effect dissolution.

Next, 1.875 g of the resulting matrix polymer solution, 3.75 g of the dispersion produced in Example 2 by uniformly dispersing MWCNTs, and 1.875 g of cyclohexanone were mixed together, giving a black MWCNT-containing dispersion (conductive bonding layer-forming composition) A4.

The resulting MWCNT-containing dispersion A4, in an amount of 2 mL, was uniformly spread with a wire bar coater (No. 12; wet film thickness, 27.4 μm) over copper foil, following which the applied material was dried at 120° C. for 20 minutes to form a conductive bonding layer, thereby producing a composite current collector B6. The composite current collector was torn and the cross-section was examined with a scanning electron microscope, whereupon the thickness of the conductive bonding layer was found to be 500 nm.

Example 7

First, a matrix polymer solution was prepared by mixing together 0.6 g of polyacrylic acid (PAA; from Aldrich Co.; Mv, ~450,000) and 14.4 g of purified water, and stirring the mixture at 80° C. for 1 hour to effect dissolution.

Next, 0.50 g of the PTPA-PBA-SO₃H synthesized in Synthesis Example 2, as the dispersant, was dissolved in 49.00 g of methanol as the dispersion medium, and 0.50 g of MWCNTs was added to the resulting solution. This mixture was subjected to 30 minutes of ultrasonic treatment at room temperature (about 25° C.) using a probe-type ultrasonicator, thereby giving a dispersion in which MWCNTs were uniformly dispersed and which was free of precipitate.

The resulting dispersion, in an amount of 13.5 g, was mixed together with 6.8 g of the matrix polymer, giving a black MWCNT-containing dispersion (conductive bonding layer-forming composition) A5.

The resulting MWCNT-containing dispersion A5, in amount of 2 mL, was uniformly spread with a wire bar coater over copper foil, following which the applied material was dried at 120° C. for 5 minutes to form a conductive bonding layer, thereby producing a composite current collector B7. The composite current collector was torn and the cross-section was examined with a scanning electron microscope, whereupon the thickness of the conductive bonding layer was found to be 400 nm.

Example 8

Aside from using aluminum foil instead of copper foil, a composite current collector B8 was produced by the same method as in Example 7. The composite current collector was torn and the cross-section was examined with a scanning electron microscope, whereupon the thickness of the conductive bonding layer was found to be 400 nm.

Example 9

First, a matrix polymer solution was prepared by mixing together 0.05 g of polyacrylic acid (PAA; from Aldrich Co.; Mv, ~450,000) and 4.95 g of methanol, and stirring the mixture at room temperature for 12 hours to effect dissolution.

Next, 5 g of the MWCNT-containing dispersion A1 prepared in Example 1 and 5 g of the resulting matrix polymer solution were mixed together. Then, 2 mL of the resulting mixture and 0.5 mL of methanol were mixed together, giving a black MWCNT-containing dispersion (conductive bonding layer-forming composition) A6.

The resulting MWCNT-containing dispersion A6, in an amount of 2 mL, was uniformly spread with a wire bar coater (No. 12; wet film thickness, 27.4 µm) over aluminum foil as the current-collecting substrate (thickness, 20 µm), following which the applied material was dried at 120° C. for 5 minutes to form a conductive bonding layer, thereby producing a composite current collector B9. The composite current collector was torn and the cross-section was examined with a scanning electron microscope, whereupon the thickness of the conductive bonding layer was found to be 300 nm.

Example 10

First, a matrix polymer solution having a polyacrylic acid concentration of 4 wt % was prepared by mixing together polyacrylic acid (PAA; from Aldrich Co.; Mv, ~450,000) and 2-propanol, and stirring the mixture.

Next, 0.50 g of the PTPA-PBA-SO$_3$H synthesized in Synthesis Example 2, as the dispersant, was dissolved in, as the dispersion medium, 43 g of 2-propanol and 6.0 g of water, following which 0.50 g of MWCNTs (available from Nanocyl as "NC7000"; outside diameter, 10 nm) was added to the resulting solution.

This mixture was subjected to 30 minutes of ultrasonic treatment at room temperature (about 25° C.) using a probe-type ultrasonicator, thereby giving a dispersion in which MWCNTs were uniformly dispersed and which was free of precipitate.

Next, 3 g of the resulting dispersion, 2.7 g of the above matrix polymer solution, 0.09 g of, as a crosslinking agent, the blocked isocyanate-containing solution TPA-B80E (80 wt %; available from Asahi Kasei Corporation), and 0.21 g of 2-propanol were mixed together, giving a MWCNT-containing dispersion (conductive bonding layer-forming composition) A7.

The resulting MWCNT-containing dispersion A7, in an amount of 2 mL, was uniformly spread with a wire bar coater (No. 12, wet film thickness, 27.4 µm) over aluminum foil (thickness, 20 µm) as the current collector, following which the applied material was dried at 120° C. for 20 minutes to form a conductive bonding layer, thereby producing a composite current collector B10. The composite current collector was torn and the cross-section was examined with a scanning electron microscope, whereupon the thickness of the conductive bonding layer was found to be 500 nm.

Example 11

Aside from using 0.09 g of 2-propanol instead of 0.09 g of the blocked isocyanate-containing solution TPA-B80E, a composite current collector B11 was produced by the same method as in Example 10. The composite current collector was torn and the cross-section was examined with a scanning electron microscope, whereupon the thickness of the conductive bonding layer was found to be 500 nm.

Example 12

First, 1.60 g of the PTPA-PBA-SO$_3$H synthesized in Synthesis Example 2, as the dispersant, was dissolved in, as the dispersion medium, 17.6 g of 2-propanol and 52.9 g of water, following which 1.60 g of MWCNTs (available from Nanocyl as NC7000; outside diameter, 10 nm) and 6.20 g of an aqueous solution of polyacrylic acid (25%, available as A-10H from Toagosei Co., Ltd.) were added. This mixture was subjected to 30 minutes of ultrasonic treatment at room temperature (about 25° C.) using a probe-type ultrasonicator, thereby giving a dispersion in which the MWCNTs were uniformly dispersed and which was free of precipitate.

Next, 8 g of a xantham gum solution (2%, KELTROL CG-SFT, from Sansho Co., Ltd.; 2-propanol:water=1:3, by weight) was added to 8 g of the resulting dispersion and stirring was carried out, giving a MWCNT-containing dispersion (conductive bonding layer-forming composition) A8.

The resulting MWCNT-containing dispersion A8, in an amount of 2 mL, was uniformly spread with a wire bar coater (No. 12; wet film thickness, 27.4 µm) over aluminum foil (thickness, 20 µm), following which the applied material was dried at 120° C. for 20 minutes to form a conductive bonding layer, thereby producing a composite current collector B12.

The viscosity of the MWCNT-containing dispersion A8, which was a composition to which a thickener had been added, was 3,100 mPa·s.

Example 13

An aqueous solution of polyacrylic acid (25%: A-10H, from Toagosei Co., Ltd.), 0.40 g, and 4.6 g of 2-propanol were added to 5 mL of the MWCNT-containing dispersion A7 prepared in Example 10, and stirring was carried out, giving a MWCNT-containing dispersion A9.

The MWCNT-containing dispersion A9, in an amount of 2 mL, was uniformly spread with a wire bar coater (No. 12; wet film thickness, 27.4 µm) over aluminum foil (thickness, 20 µm), following which the applied material was dried at 120° C. for 20 minutes to form a conductive bonding layer, thereby producing a composite current collector B13.

The viscosity of the MWCNT-containing dispersion A9, which was a composition to which a thickener had been added, was 11 mPa·s.

Comparative Example 4

Aside from using aluminum foil (thickness, 20 µm) instead of copper foil as the current-collecting substrate, a composite current collector Y3 was produced in the same way as in Comparative Example 1. The composite current collector was torn and the cross-section was examined with a scanning electron microscope, whereupon the thickness of the conductive bonding layer was found to be 200 nm.

Comparative Example 5

Aside from using aluminum foil (thickness, 20 μm) instead of copper foil as the current-collecting substrate, a composite current collector Y4 was produced in the same way as in Comparative Example 2. The composite current collector was torn and the cross-section was examined with a scanning electron microscope, whereupon the thickness of the conductive bonding layer was found to be 200 nm.

Comparative Example 6

First, a matrix polymer solution was prepared by mixing 0.05 g of polyacrylic aid (PAA, from Aldrich; Mv, ~450,000) with 4.95 g of PG, and effecting dissolution by stirring at room temperature for 12 hours.

Next, 5 g of the MWCNT-containing dispersion X1 prepared in Comparative Example 1 and 5 g of the above matrix polymer solution were mixed together, whereupon the MWCNTs agglomerated. As a result, an MWCNT-containing dispersion could not be obtained, and so a conductive bonding layer was not obtained.

Comparative Example 7

First, a matrix polymer solution was prepared by mixing together 0.05 g of polyacrylic acid (PAA; from Aldrich Co.; Mv, ~450,000) and 4.95 g of NMP, and stirring the mixture at room temperature for 12 hours to effect dissolution.

Next, 5 g of the MWCNT-containing dispersion X2 prepared in Comparative Example 2 and 5 g of the above matrix polymer solution were mixed together, whereupon the MWCNTs agglomerated. As a result, an MWCNT-containing dispersion could not be obtained, and so a conductive bonding layer was not obtained.

It is apparent from the above results that a conductive bonding layer can be suitably formed by using the conductive bonding layer-forming composition of the invention, and also that this film-forming ability is not lost even in cases where a composition having a crosslinking agent or a thickener added thereto is used.

Particularly in the case of film formation by a so-called wet process, for the sake of film formation having a good reproducibility, it is desired that the viscosity of the composition be adjusted according to the method of application. In this invention, adjustment of the viscosity is possible not only by changing, for example, the type of solvent, the dispersant or the concentration of CNTs, but also by adding a suitable thickener, thus making it possible to obtain high-viscosity MWCNT-containing dispersions suitable for slit die coating or screen printing, and low-viscosity MWCNT-containing dispersions suitable for gravure printing or bar coating.

[5] Evaluation of Adhesion Between Conductive Bonding Layer and Current-Collecting Substrate, and Solvent Resistance of Conductive Bonding Layer Using the composite current collectors B2 to B11 produced in Examples 2 to 11 and the composite current collectors Y3 and Y4 produced in Comparative Examples 4 and 5, evaluations of the adhesion between the conductive bonding layer and the current-collecting substrate and evaluations of the solvent resistance of the conductive bonding layer were carried out by the procedures described below.

Following the same method as described above, cross-cutting was carried out on the conductive bonding layers of composite current collectors B2 to B11 and Y3 and Y4, and evaluations of the adhesion were carried out using pressure-sensitive adhesive tape. In addition, the solvent resistance was evaluated by bringing a cotton swab impregnated with NMP or water into contact with and passing it back-and-forth over the conductive bonding layer, and assigning a rating of "Good" in cases where the MWCNT layer did not peel and fall off and a rating of "NG" in cases where the layer peeled and fell off. The evaluation results are shown in Table 3. For the sake of reference, the compositions for Comparative Examples 6 and 7 are also shown in Table 3.

TABLE 3

| Composite current collector | Highly branched polymer | Matrix polymer | Dispersion medium | Crosslinking agent | Dispersibility* | Metal foil | Solvent resistance NMP | Solvent resistance Water | Adhesion |
|---|---|---|---|---|---|---|---|---|---|
| Example 2 | PTPA-PBA | PMMA | NMP | — | good | copper | NG | good | good |
| Example 3 | PTPA-PBA | PMMA | NMP | — | good | aluminum | NG | good | good |
| Example 4 | PTPA-PBA | EB | NMP | — | good | copper | NG | good | good |
| Example 5 | PTPA-PBA | EB | NMP | — | good | aluminum | NG | good | good |
| Example 6 | PTPA-PBA | PU | NMP | — | good | copper | NG | good | good |
| Example 7 | PTPA-PBA-SO$_3$H | PAA | MeOH/water | — | good | copper | good | NG | good |
| Example 8 | ptpa-pBA-SO$_3$H | PAA | MeOH/water | — | good | aluminum | good | NG | good |
| Example 9 | PTPA-PBA-SO$_3$H | PAA | MeOH | — | good | aluminum | good | NG | good |
| Example 10 | PTPA-PBA | PAA | IPA/water | blocked isocyanate | good | aluminum | good | good | good |
| Example 11 | PTPA-PBA | PAA | IPA/water | — | good | aluminum | good | NG | good |
| Comparative Example 4 | PVP | — | PG | — | good | aluminum | NG | NG | NG |
| Comparative Example 5 | PVP | — | NMP | — | good | aluminum | NG | NG | NG |
| Comparative Example 6 | PVP | PAA | PG | — | NG | — | — | — | — |
| Comparative Example 7 | PVP | PAA | NMP | — | NG | — | — | — | — |

*good: Cases in which MWCNTs uniformly dispersed. NG: Cases in which MWCNTs agglomerated.

The conductive bonding layers of the composite current collectors B2 to B11 produced in Examples 2 to 11 exhibited a high adhesion with the copper foil or aluminum foil serving as the current-collecting substrate, and did not peel off whatsoever. By contrast, the conductive bonding layers of the composite current collectors Y3 and Y4 produced in Comparative Examples 4 and 5 peeled from the aluminum foil.

It is apparent from the above results that PTPA-PBA and PTPA-PBA-SO$_3$H function as carbon nanotube dispersants, and that conductive thin-films having a high adhesion with the current-collecting substrate can be formed with compositions containing these dispersants, whereas PVP, which is a common carbon nanotube dispersant, cannot form such thin-films.

Moreover, the conductive bonding layers that were produced from dispersions in which NMP serves as the dispersion medium and are present in the composite current collectors B2 to B6 produced in Examples 2 to 6 exhibit a high resistance to water, the conductive bonding layers that were produced from dispersions in which MeOH, IPA or the like serves as the dispersion media and are present in the composite current collectors B7 to B9 and B11 produced in Examples 7 to 9 and 11 exhibit a high resistance to NMP, and the conductive bonding layer that was produced from a dispersion in which MeOH, IPA or the like serves as the dispersion medium and is present in the composite current collector B10 produced in Example 10 exhibits a high resistance to both NMP and water.

From these results, it was apparent that, even in cases where a matrix polymer has been added, a conductive bonding layer having a high adhesion with the metal foil serving as the current-collecting substrate can be produced, and in particular that by adding a crosslinking agent to a conductive bonding layer-forming composition in which water or an alcohol-based solvent such as isopropanol serves as the dispersion medium, there can be achieved compositions which give thin-films that exhibit a high resistance to both NMP and water.

[6] Evaluation of Adhesion Between Matrix Polymer-Containing Conductive Bonding Layer and Binder Using the composite current collectors B4 and B6 to B9 produced in Examples 4 and 6 to 9 and the composite current collectors Y3 and Y4 produced in Comparative Examples 4 and 5, evaluations of the adhesion between the matrix polymer-containing conductive bonding layer and the binder were carried out by the following procedure.

The binder solution was uniformly spread over each composite current collector by the doctor blade method, and dried, first at 80° C. for 30 minutes then at 120° C. for 30 minutes, thereby forming a binder thin-film.

An NMP solution of polyvinylidene fluoride (PVdF) (12 wt %; available from Kureha Corporation as KF Polymer L#1120; wet film thickness, 100 μm) or an aqueous solution of PAA (Aldrich Co.; Mv, ~450,000) (4 wt %; wet film thickness, 500 μm) was used as the binder solution. The thickness of thin-films formed at this time with PVdF was 5 μm, and the thickness of thin-films formed with PAA was 16 μm.

Following the same method as described above, cross-cutting was carried out on the binder layer and the conductive bonding layer, and the adhesion was evaluated using pressure-sensitive adhesive tape. For the sake of comparison, following the same method, binder thin-films were formed on, respectively, copper foil (unmodified copper foil) and aluminum foil (unmodified aluminum foil) as the current-collecting substrate, and the adhesion was evaluated (Comparative Examples 8 and 9). The evaluation results are shown in Table 4.

TABLE 4

| Composite current collector (current-collecting substrate) | Highly branched polymer | Matrix polymer | Dispersion medium | Metal foil | Binder | Adhesion |
| --- | --- | --- | --- | --- | --- | --- |
| Example 4 | PTPA-PBA | EB | NMP | copper | PAA | good |
| Example 6 | PTPA-PBA | PU | NMP | copper | PAA | good |
| Example 7 | PTPA-PBA-SO$_3$H | PAA | MeOH/water | copper | PVdF | good |
| Example 8 | PTPA-PBA-SO$_3$H | PAA | MeOH/water | aluminum | PVdF | good |
| Example 9 | PTPA-PBA-SO$_3$H | PAA | MeOH | aluminum | PVdF | good |
| Comparative Example 4 | PVP | — | PG | aluminum | PVdF | NG |
| Comparative Example 5 | PVP | — | NMP | aluminum | PVdF | NG |
| Comparative Example 8 | — | — | — | copper | PVdF | NG |
| | | | | copper | PAA | NG |
| Comparative Example 9 | — | — | — | aluminum | PVdF | NG |

The conductive bonding layers of composite current collectors B4 and B6 to B9 exhibited a high adhesion with the binder and did not separate whatsoever. However, the conductive bonding layers of composite current collectors Y3 and Y4 and unmodified copper foil and aluminum foil had a low adhesion with the binder, and separation was observed. From these results, it is apparent that, even in cases where an aqueous binder and a matrix polymer have been added, as in cases where they are not added, a conductive bonding layer having a high adhesion with the metal foil serving as the current conducting substrate can be produced.

It is also apparent that by using as the matrix polymer PAA, which when used in combination with PTPA-PBA-SO$_3$H can impart bondability to aluminum foil in particular, even in cases where an aqueous solvent is employed as the dispersion medium, a dispersion of good dispersibility can be prepared, and moreover that composite current collectors produced using this have a high bondability to ordinary PVdF as the binder.

[7] Electrode Production and Evaluation of Adhesion Between Conductive Bonding Layer and Active Material Layer Example 14

First, graphite (Gr; available as CGB-15 from Nippon Graphite Industries Ltd.; 5.2 g) as the active material, an NMP solution of PVdF (12 wt %; 54.1 g) as the binder, and acetylene black (AB; available as Denka Black from Denki Kagaku Kogyo K.K.; 1.3 g) as a conductive additive were mixed together in a bead mill (0.5 mm diameter zirconia beads, 2,000 rpm, 30 minutes), thereby preparing an electrode slurry S1 (solids concentration, 21.4 wt %; Gr:PVdF: AB=40:50:10 (weight ratio)).

The electrode slurry S1 prepared above was uniformly spread by the doctor blade method onto the conductive bonding layer of the composite current collector B1 produced in Example 1 to a wet film thickness of 50 μm (film thickness after drying, 10 μm), 100 μm (film thickness after drying, 16 μm), 200 μm (film thickness after drying, 27 μm) or 300 μm (film thickness after drying, 38 μm), and subsequently dried, first at 80° C. for 30 minutes then at 120° C. for 30 minutes, to form an active material layer on the conductive bonding layer, thereby producing electrodes C1 to C4.

Comparative Example 10

Aside from using the composite current collector Y1 produced in Comparative Example 1 instead of composite current collector B1, electrodes Z1 to Z4 were produced by the same method as in Example 14.

Comparative Example 11

Aside from using the composite current collector Y2 produced in Comparative Example 2 instead of composite current collector B1, electrodes Z5 to Z8 were produced by the same method as in Example 14.

Comparative Example 12

Aside from using unmodified copper foil instead of composite current collector B1, electrodes Z9 to Z12 were produced by the same method as in Example 14.

Using electrodes C1 to C4 and Z1 to Z12 produced in Example 14 and Comparative Examples 10 to 12, evaluations of the adhesion between the conductive bonding layer and the active material layer were carried out by the following procedure.

Following the same method as described above, crosscutting was carried out on the active material layer and/or the conductive bonding layer, pressure-sensitive adhesive tape (CT-12S2P, from Nichiban Co., Ltd.) was attached to the crosscut area, and the tape was peeled off. This operation was carried out on three test pieces for each type of electrode.

The evaluation results are shown in Table 5. In Table 5, the denominator of the fraction is the number of electrodes produced (three test pieces), and the numerator is the number of electrodes in which no peeling whatsoever arose in the peel test.

TABLE 5

|  | Adhesion | | | |
| --- | --- | --- | --- | --- |
|  | Wet film thickness 50 μm | Wet film thickness 100 μm | Wet film thickness 200 μm | Wet film thickness 300 μm |
| Example 14 | 3/3 | 3/3 | 3/3 | 3/3 |
| Comparative Example 10 | 1/3 | 0/3 | 0/3 | 1/3 |
| Comparative Example 11 | 1/3 | 0/3 | 1/3 | 1/3 |
| Comparative Example 12 | 0/3 | 0/3 | 0/3 | 0/3 |

In the peel test, because the PTPA-PBA-$SO_3$H-containing conductive bonding layers in electrodes C1 to C4 produced in Example 14 have a high adhesion to the PVdF serving as the binder included in the active material layer, peeling of the active material layer in electrodes C1 to C4 was not observed. By contrast, because the conductive bonding layers in electrodes Z1 to Z8 produced in Comparative Examples 10 and 11 do not contain any substance having a high adhesion with the binder and the electrodes Z9 to Z12 produced in Comparative Example 12 do not have a conductive bonding layer, most of the active material layers in electrodes Z1 to Z12 peeled off.

Example 15

Silicon (Si; available as SIE23PB from Kojundo Chemical Laboratory Co., Ltd.; 5.46 g) as the active material, an aqueous solution of PAA (4 wt %; 53.55 g) as the binder, sodium carboxymethyl cellulose (NaCMC; available as CMF-150 from As One Corporation; 0.378 g) as a thickener, and acetylene black (AB; available as Denka Black from Denki Kagaku Kogyo K.K.; 0.42 g) as a conductive additive were mixed together in a bead mill (0.5 mm diameter zirconia beads, 2,000 rpm, 30 minutes), thereby preparing an electrode slurry S2 (solids concentration, 14 wt %; Si:PAA: NaCMC:AB=65:25.5:4.5:5 (weight ratio)).

The electrode slurry S2 prepared above was uniformly spread by the doctor blade method onto the conductive bonding layer of the composite current collector B6 produced in Example 6 to a wet film thickness of 100 μm (film thickness after drying, 10 μm), 200 μm (film thickness after drying, 20 μm) or 300 μm (film thickness after drying, 50 μm), and subsequently dried, first at 80° C. for 30 minutes then at 120° C. for 30 minutes, to form an active material layer on the conductive bonding layer, thereby producing electrodes C5 to C7.

Comparative Example 13

Aside from using copper foil (unmodified copper foil) that is a current-collecting substrate instead of composite current collector B6, electrodes Z13 to Z15 were produced by the same method as in Example 15.

Using electrodes C5 to C7 and Z13 to Z15 produced in Example 15 and Comparative Example 13, evaluations of the adhesion between the conductive bonding layer and the active material layer were carried out by the following procedure.

Following the same method as described above, crosscutting was carried out on the active material layer and/or the conductive bonding layer, pressure-sensitive adhesive tape (CT-12S2P, from Nichiban Co., Ltd.) was attached to the crosscut area, and the tape was peeled off. This operation was carried out on three test pieces for each type of electrode.

The evaluation results are shown in Table 6. In Table 6, the denominator of the fraction is the number of electrodes produced (three test pieces), and the numerator is the number of electrodes in which no peeling whatsoever arose in the peel test.

TABLE 6

| | Adhesion | | |
|---|---|---|---|
| | Wet film thickness 100 μm | Wet film thickness 200 μm | Wet film thickness 300 μm |
| Example 15 | 3/3 | 3/3 | 3/3 |
| Comparative Example 13 | 0/3 | 0/3 | 0/3 |

In the peel test, because the PTPA-PBA-containing conductive bonding layers in electrodes C5 to C7 produced in Example 15 have a high adhesion to the PAA serving as the binder included in the active material layer, peeling of the active material layer in electrodes C5 to C7 was not observed. By contrast, because the conductive bonding layers in electrodes Z13 to Z15 produced in Comparative Example 13 do not contain any substance having a high adhesion with the binder, most of the active material layers in electrodes Z13 to Z15 peeled off.

From the above results, it is apparent that, so long as the conditions of a high resistance by the electrode slurry to the dispersion medium, high adhesion with the metal foil serving as the current-collecting substrate and high adhesion with the binder are met, the adhesion between the conductive bonding layer and the electrode and the adhesion between the conductive bonding layer and the active material layer become high. As a result, the thin-film that has formed on the current-collecting substrate does not easily fall off, enabling an electrode having an excellent durability to be produced.

[8] Production of Lithium Ion Secondary Battery

Example 16

Silicon (Si; available as SIE23PB from Kojundo Chemical Laboratory Co., Ltd.; 24.0 g) as the active material, an aqueous solution of PAA (8 wt %; 25.5 g) as the binder, sodium carboxymethyl cellulose (NaCMC; available as CMF-150 from As One Corporation; 0.360 g) as a thickener, and acetylene black (AB; available as Denka Black from Denki Kagaku Kogyo K.K.; 3.59 g) as a conductive additive were mixed together in a bead mill (0.5 mm diameter zirconia beads, 2,000 rpm, 30 minutes), thereby preparing an electrode slurry S3 (solids concentration, 50 wt %; Si:PAA: NaCMC:AB=80:6.8:1.2:12 (weight ratio)).

The electrode slurry S3 prepared above was uniformly spread (to a wet film thickness of 25 μm) by the doctor blade method onto the conductive bonding layer of the composite current collector B1 produced in Example 1 and subsequently dried, first at 80° C. for 30 minutes then at 120° C. for 30 minutes, to form an active material layer (film thickness after drying, 10 μm) on the conductive bonding layer, thereby producing an electrode C8.

Next, using electrode C8, a lithium ion secondary battery was manufactured as described below.

Electrode C8 was die-cut in the shape of a 10 mm diameter disk and the weight was measured, following which the electrode disk was vacuum-dried at 100° C. for 15 hours and then transferred to a glovebox filled with argon. A stack of six pieces of lithium foil (Honjo Chemical Corporation; thickness, 0.17 mm) that had been die-cut to a diameter of 14 mm was set in a 2032 coin cell (Hosen KK) case, one piece of separator (Celgard 2400) die-cut to a diameter of 16 mm that had been permeated for at least 24 hours with an electrolyte solution (Kishida Chemical Co., Ltd.; ethylene carbonate:diethyl carbonate=1:1 (volume ratio) solution containing 1 mol/L of the electrolyte lithium hexafluorophosphate) was placed on the foil, and electrode C8 was placed on top thereof with the active material-coated side facing down. Next, one drop of the electrolyte solution was deposited thereon, after which a cover to which a washer and a spacer had been welded and a gasket were placed on top, and sealing was carried out with a coil cell crimper. The cell was then placed at rest for 24 hours, thereby giving a secondary battery for testing.

Comparative Example 14

Aside from using the composite current collector Y1 produced in Comparative Example 1 instead of composite current collector B1, a lithium ion secondary battery was produced by the same method as in Example 16.

Comparative Example 15

Aside from using the composite current collector Y2 produced in Comparative Example 2 instead of composite current collector B1, a lithium ion secondary battery was produced by the same method as in Example 16.

Comparative Example 16

Aside from using copper foil (unmodified copper foil), which is a current conducting substrate, instead of composite current collector B1, a lithium ion secondary battery was produced by the same method as in Example 16.

Example 17

First, as the dispersant, 0.50 g of the PTPA-PBA-SO$_3$H synthesized in Synthesis Example 2 was dissolved in 49.00 g of methanol as the dispersion medium, and 0.50 g of MWCNTs was added to this solution. This mixture was subjected to 30 minutes of ultrasonic treatment at room temperature (about 25° C.) using a probe-type ultrasonicator, thereby giving a black MWCNT-containing dispersion A10 in which the MWCNTs were uniformly dispersed and which was free of precipitate.

Next, 2 mL of the resulting MWCNT-containing dispersion A10 was uniformly spread with a wire bar coater (No. 12, wet film thickness, 27.4 μm) over copper foil, following which the applied material was dried at 120° C. for 5 minutes to form an electrically conductive bonding layer, thereby producing composite current collector B14. The composite current collector was torn and the cross-section was examined with a scanning electron microscope, whereupon the thickness of the conductive bonding layer was found to be 700 nm.

In a separate procedure, graphite (Gr; available as CGB-15 from Nippon Graphite Industries Ltd.; 12.7 g) as the active material, an NMP solution of PVdF (12 wt %; 45.7 g) as the binder, and acetylene black (AB; available as Denka Black from Denki Kagaku Kogyo K.K.; 1.8 g) as a conductive additive were mixed together in a bead mill (0.5 mm diameter zirconia beads, 2,000 rpm, 30 minutes), thereby preparing an electrode slurry S4 (solids concentration, 30.2 wt %; Gr:PVdF:AB=70:20:10 (weight ratio)).

The electrode slurry S4 thus prepared was uniformly spread by the doctor blade method onto the conductive bonding layer of the composite current collector B14 to a wet film thickness of 200 μm and subsequently dried, first at 80° C. for 30 minutes then at 120° C. for 30 minutes, to form an active material layer (film thickness after drying, 60 μm) on the conductive bonding layer, thereby producing an electrode C9.

Aside from using electrode C9 instead of electrode C8, a lithium ion secondary battery was then fabricated by the same method as in Example 16.

Comparative Example 17

Aside from using copper foil (unmodified copper foil), which is a current conducting substrate, instead of composite current collector B14, a lithium ion secondary battery was produced by the same method as in Example 17.

Example 18

Aside from using aluminum foil (thickness, 20 μm) as the current-collecting substrate, composite current collector B15 was produced by the same method as in Example 1. The composite current collector was torn and the cross-section was examined with a scanning electron microscope, whereupon the thickness of the conductive bonding layer was found to be 300 nm.

In a separator procedure, lithium iron phosphate (LFP; available from Tatung Fine Chemicals Co; 17.3 g) as the active material, an NMP solution of PVdF (12 wt %; 12.8 g) as the binder, acetylene black (AB; available as Denka Black from Denki Kagaku Kogyo K.K.; 0.384 g) as a conductive additive, and NMP (9.54 g) were mixed together at 3,500 rpm for 1 minute in a homogenizing disperser. The mixture was then subjected to mixing treatment using a thin-film spin-type high-speed mixer at a peripheral speed of 20 m/s for 60 seconds, and subsequently deaerated at 1,000 rpm for 2 minutes with a planetary centrifugal mixer, thereby producing electrode slurry S5 (solids concentration, 48 wt %; LFP:PVdF:AB=90:8:2 (weight ratio)).

The electrode slurry S5 thus prepared was uniformly spread by the doctor blade method onto the conductive bonding layer of the composite current collector B15 to a wet film thickness of 200 μM and subsequently dried, first at 80° C. for 30 minutes then at 120° C. for 30 minutes, to form an active material layer (film thickness after drying, 60 μm) on the conductive bonding layer, thereby producing an electrode C10.

Aside from using electrode C10 instead of electrode C9, a lithium ion secondary battery was then fabricated by the same method as in Example 17.

Example 19

Aside from using composite current collector B9 produced in Example 9 instead of composite current collector B15, a lithium ion secondary battery was produced by the same method as in Example 18.

Comparative Example 18

Aside from using composite current collector Y3 produced in Comparative Example 4 instead of composite current collector B15, a lithium ion secondary battery was produced by the same method as in Example 18.

Comparative Example 19

Aside from using composite current collector Y4 produced in Comparative Example 5 instead of composite current collector B15, a lithium ion secondary battery was produced by the same method as in Example 18.

Comparative Example 20

Aside from using aluminum foil (unmodified aluminum foil), which is a current-collecting substrate, instead of composite current collector B15, a lithium ion secondary battery was produced by the same method as in Example 18.

Example 20

Lithium iron phosphate (LFP; available from Tatung Fine Chemicals Co; 7.48 g) as the active material, an NMP solution of PVdF (12 wt %; 5.85 g) as the binder, acetylene black (AB; available as Denka Black from Denki Kagaku Kogyo K.K.; 0.61 g) as a conductive additive, and NMP (11.2 g) were mixed together in a mortar for 20 minutes, thereby preparing an electrode slurry S6 (solids concentration, 35 wt %; LFP:PVdF:AB=85:8:7 (weight ratio)).

The electrode slurry S6 thus prepared was uniformly spread to a wet film thickness of 200 μm by the doctor blade method onto the conductive bonding layer of composite current collector B8 produced in Example 8 and subsequently dried, first at 80° C. for 30 minutes then at 120° C. for 30 minutes, to form an active material layer (film thickness after drying, 60 μm) on the conductive bonding layer, thereby producing electrode C11.

Aside from using electrode C11 instead of electrode C9, a lithium ion secondary battery was then fabricated by the same method as in Example 17.

Comparative Example 21

Aside from using aluminum foil (unmodified aluminum foil), which is a current-collecting substrate, instead of composite current collector B8, a lithium ion secondary battery was produced by the same method as in Example 20.

Example 21

Aside from using composite current collector B10 produced in Example 10 instead of composite current collector B8, a lithium ion secondary battery was produced by the same method as in Example 20. A separate batch of slurry prepared by the same method as in Example 20 was used to form the conductive bonding layer.

Example 22

Aside from using composite current collector B11 produced in Example 11 instead of composite current collector B10, a lithium ion secondary battery was produced by the same method as in Example 21.

Comparative Example 22

Aside from using aluminum foil (unmodified aluminum foil), which is a current-collecting substrate, instead of composite current collector B10, a lithium ion secondary battery was produced by the same method as in Example 21.

Example 23

Aside from using composite current collector B12 produced in Example 12 instead of composite current collector B15, a lithium ion secondary battery was produced by the same method as in Example 18. A separate batch of slurry prepared by the same method as in Example 18 was used to form the conductive bonding layer.

Example 24

Aside from using composite current collector B13 produced in Example 13 instead of composite current collector B12, a lithium ion secondary battery was produced by the same method as in Example 23.

Comparative Example 23

Aside from using aluminum foil (unmodified aluminum foil), which is a current-collecting substrate, instead of composite current collector B12, a lithium ion secondary battery was produced by the same method as in Example 23.

Example 25

Aside from using lithium manganate (LiMn$_2$O$_4$, abbreviated below as "LMO"; from Hohsen Corporation; 17.3 g) instead of lithium iron phosphate as the active material, an electrode slurry S7 was prepared by the same method as in Example 18.

Next, aside from using electrode slurry S7 instead of electrode slurry S5 and using composition current conductor B13 produced in Example 13 instead of composite current conductor B15, a lithium ion secondary battery was fabricated by the same method as in Example 18 (film thickness after drying of the active material layer, 55 µm).

Comparative Example 24

Aside from using aluminum foil (unmodified aluminum foil), which is a current-collecting substrate, instead of composite current collector B13, a lithium ion secondary battery was produced by the same method as in Example 25.

[9] Evaluation as Negative Electrodes of Lithium Ion Secondary Batteries

Figure 3:
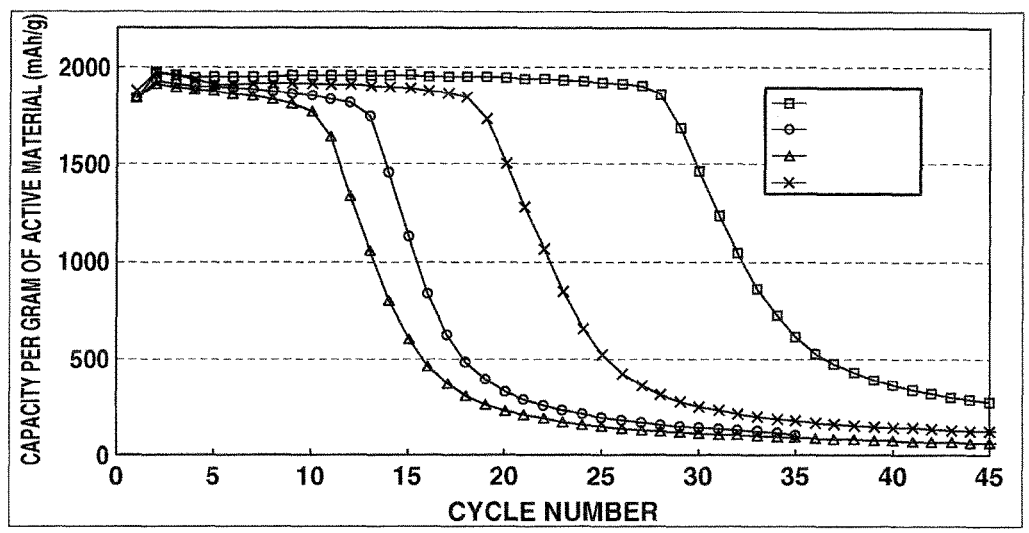
FIG. 3 is a graph showing the cycle characteristics of the discharge capacities for the lithium ion secondary batteries produced in Example 16 and Comparative Examples 14 to 16.

The physical properties of the negative electrodes in the lithium ion secondary batteries produced in Example 16 and Comparative Examples 14 to 16 were evaluated. Cycle tests were carried out under the conditions indicated below. The cycle characteristics of the discharge capacity are shown in FIG. 3.
 Current: 0.1 C constant-current charge/discharge (in the first cycle only, constant-current, constant-voltage charging was carried out at 0.01 V; the capacity of Si was set to 4,200 mAh/g)
 Cut-off voltage: 1.50 V to 0.01 V
 Charge capacity: up to 2,000 mAh, based on weight of active material
 Temperature: room temperature In Example 16, compared with Comparative Example 16, it is apparent that the cycle number at which the discharge capacity begins to decrease from about 2,000 mAh/g is large, that adhesion improves on account of the presence of a MWCNT layer between the active material layer and the current conducting substrate, and that the battery life is improved. On the other hand, in Comparative Examples 14 and 15, the adhesion of the MWCNT layer is inadequate, and so the life is shorter than in cases where unmodified copper foil was used. From the above, it is apparent that the life of a silicon negative electrode can be improved by using a dispersant having a high adhesion to the current-collecting substrate.

Figure 4:
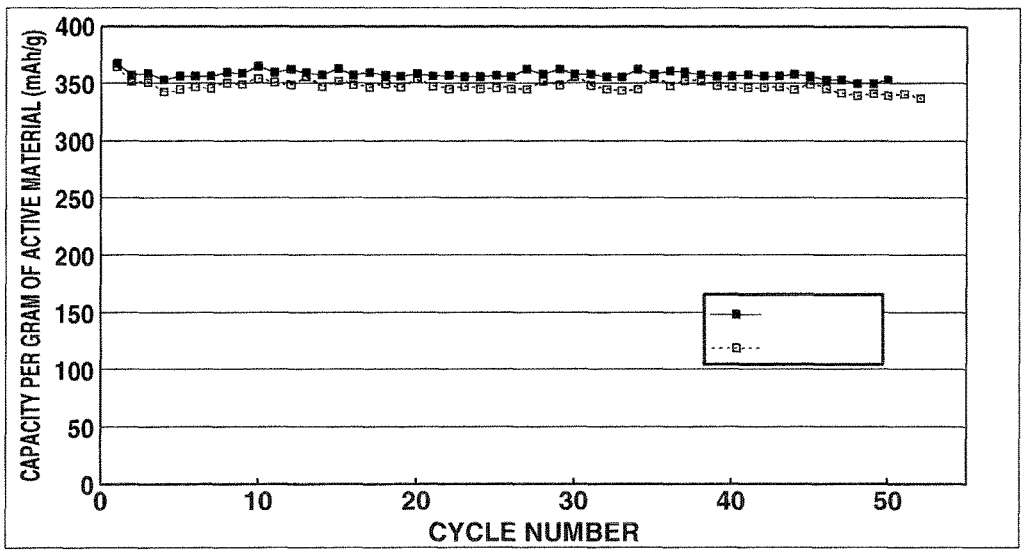
FIG. 4 is a graph showing the cycle characteristics of the discharge capacities for the lithium ion secondary batteries produced in Example 17 and Comparative Example 17.

The physical properties of the negative electrodes of the lithium ion secondary batteries produced in Example 17 and Comparative Example 17 were evaluated. First, in order to evaluate the stability of the MWCNT layer, cycle tests were carried out under the conditions indicated below. The cycle characteristics of the discharge capacity are shown in FIG. 4.
 Current: 0.2 C constant-current charge/discharge (the capacity of Gr was set to 372 mAh/g)
 Cut-off voltage: 1.50 V to 0.01 V
 Temperature: room temperature In both Example 17 and Comparative Example 17, a discharge capacity that is about the theoretical capacity for Gr was obtained by about the 50$^{th}$ cycle, and so deterioration was not observed in either case. It is apparent from this that the MWCNT layer does not incur reductive decomposition even at a low-voltage boundary near 0 V with respect to lithium, indicating that it is possible to suitably use such a layer as the negative electrode in lithium ion batteries.

Figure 5:
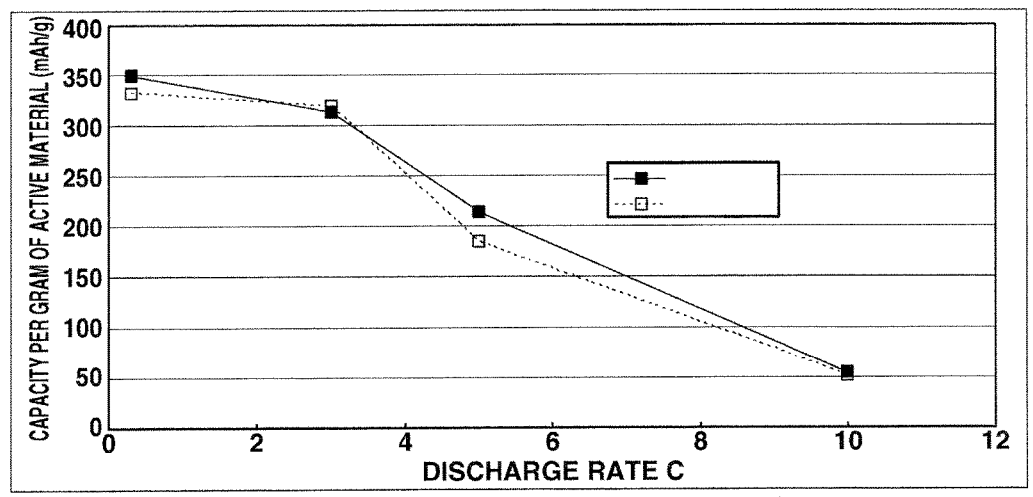
FIG. 5 is a graph showing the rate dependence of the discharge capacities for the lithium ion secondary batteries produced in Example 17 and Comparative Example 17.

Next, in order to evaluate the influence of the MWCNT layer on the cell resistance, a rate test was carried out under the conditions indicated below. The rate dependence of the discharge capacity is shown in FIG. 5.
 Current: 0.3 C constant-current charging, 0.3 C, 3 C, 5 C and 10 C constant-current discharging (the capacity of Gr was set to 372 mAh/g, and the discharge rate was increased every 5 cycles)
 Cut-off voltage: 1.50 V to 0.01 V
 Temperature: room temperature In both Example 17 and Comparative Example 17, a decreasing trend in the discharge capacity was observed together with an increase in the discharge rate. The degree of this decreasing trend was about the same in both Example 17 and Comparative Example 17. This indicates that the MWCNT layer does not act as a major resistance component, and so it is apparent that such a layer can be used as the negative electrode in lithium ion batteries that carry out high-speed charging/discharging.

[10] Evaluation as Positive Electrodes of Lithium Ion Secondary Batteries

Figure 6:
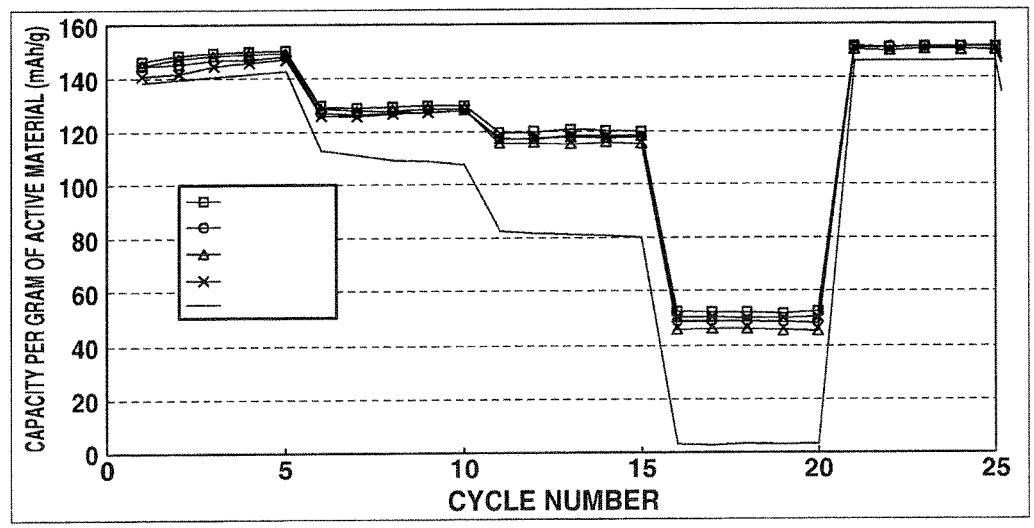
FIG. 6 is a graph showing the cycle/rate characteristics of the discharge capacities for the lithium ion secondary batteries produced in Examples 18 and 19 and in Comparative Examples 18 to 20.
Figure 7:
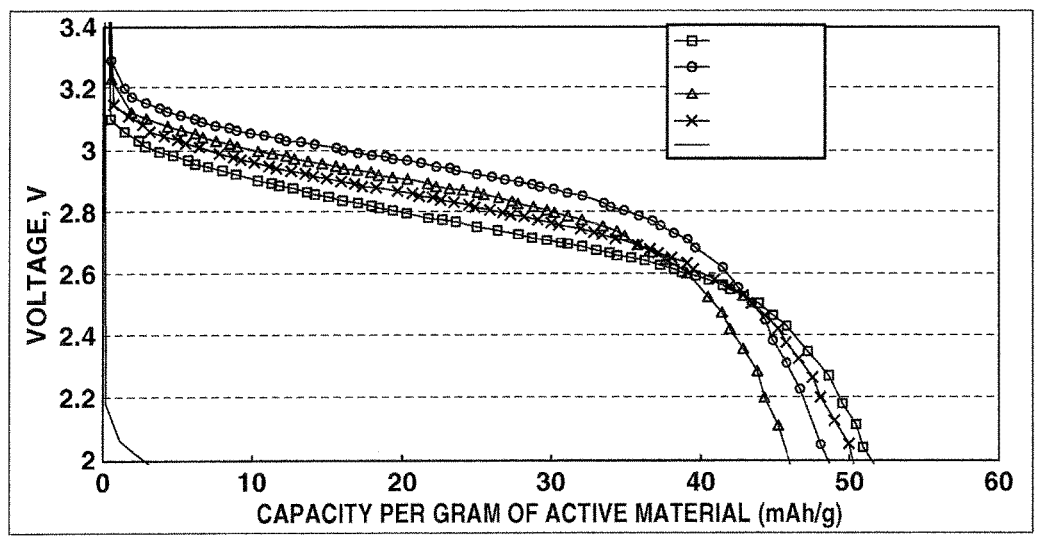
FIG. 7 is a graph showing the discharge curves at a discharge rate of 10 C for the lithium ion secondary batteries produced in Examples 18 and 19 and in Comparative Examples 18 to 20.

The physical properties of the positive electrodes in the lithium ion secondary batteries produced in Examples 18 and 19 and Comparative Examples 18 to 20 were evaluated. FIG. 6 shows the cycle/rate characteristics of the discharge capacity, and FIG. 7 shows the discharge curves at a discharge rate of 10 C.
 Current: 0.5 C constant-current charging, 0.5 C, 3 C, 5 C and 10 C constant-current discharging (the capacity of LFP was set to 170 mAh/g and, after increasing the discharge rate every 5 cycles, the discharge rate was ultimately returned to 0.5 C)
 Cut-off voltage: 4.50 V to 2.00 V
 Temperature: room temperature As shown in FIG. 6, it is apparent that by having a conductive bonding layer, the percent retention of capacity during high-rate discharge with respect to low-rate discharge increases. Also, as shown in FIG. 7, it is apparent that by using a composite current collector B9 having a high resistance to NMP and a high adhesion to PVdF, the voltage during discharge can be kept high.

Figure 8:
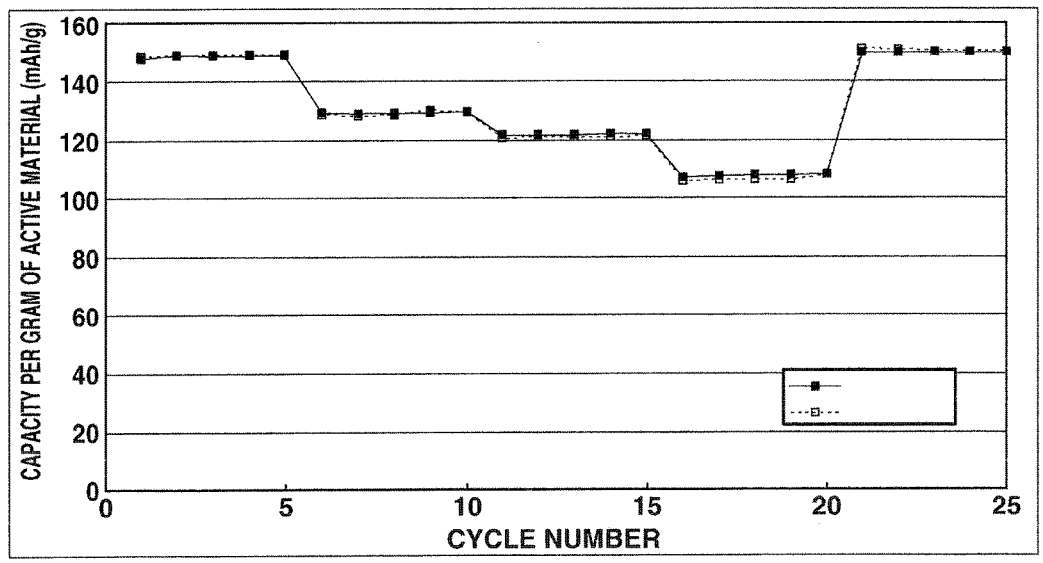
FIG. 8 is a graph showing the cycle/rate characteristics of the discharge capacities for the lithium ion secondary batteries produced in Example 20 and Comparative Example 21.
Figure 9:
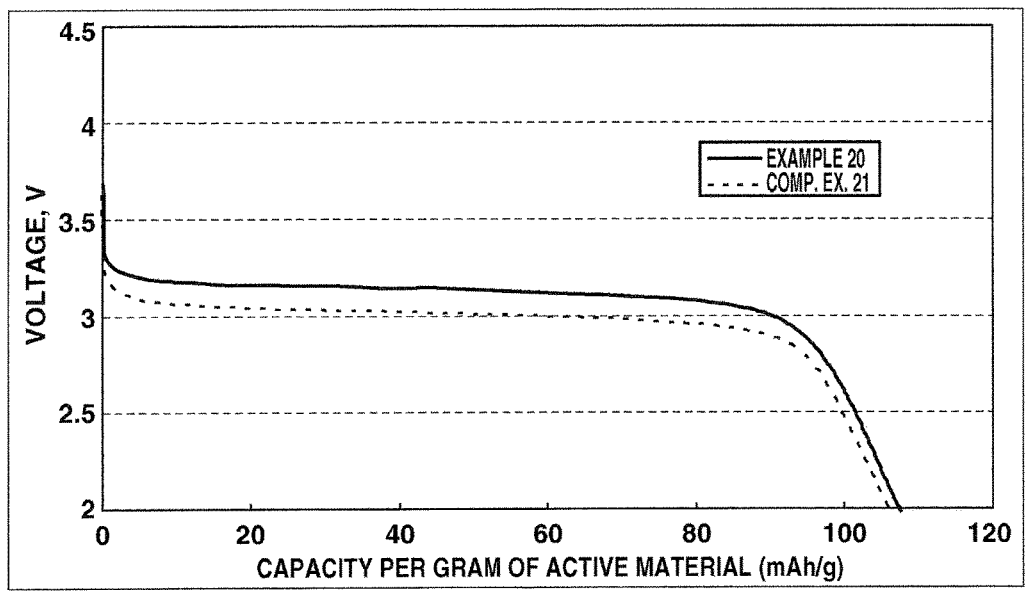
FIG. 9 is a graph showing the discharge curves at a discharge rate of 10 C for the lithium ion secondary batteries produced in Example 20 and Comparative Example 21.

The physical properties as positive electrodes were evaluated for the lithium ion secondary batteries fabricated in Example 20 and Comparative Example 21. A charge/discharge test was carried out under the conditions indicated below in order to evaluate at the same time both the stability of the MWCNT layer and the influence of the MWCNT layer on cell resistance. FIG. 8 shows the cycle/rate characteristics of the discharge capacity, and FIG. 9 shows the discharge curves at a discharge rate of 10 C.

Current: 0.5 C constant-current charging, 0.5 C, 3 C, 5 C and 10 C constant-current discharging (the capacity of LFP was set to 170 mAh/g and, after increasing the discharge rate every 5 cycles, the discharge rate was ultimately returned to 0.5 C)

Cut-off voltage: 4.50 V to 2.00 V

Temperature: room temperature

As shown in FIG. 8, in both Example 20 and Comparative Example 21, a discharge capacity that is about 90% of the theoretical capacity was obtained at 0.5 C, and deterioration in the discharge capacity was not observed even after 25 cycles. It is apparent from this that the MWCNT layer does not give rise to oxidative deterioration even in a high-voltage environment near 4.5 V with respect to lithium, and so can be suitably used as the positive electrode for a lithium ion battery.

Also, as shown in FIG. 9, the voltage during discharge is higher in Example 20 than in Comparative Example 21. As a result, compared with Comparative Example 21, the presence in Example 20 of a MWCNT layer between the active material layer and the current conducting substrate increases adhesion, which means that the interfacial resistance is low; i.e., that the energy which can extracted during discharge has increased. Hence, by introducing a MWCNT layer, lithium ion secondary batteries having a higher output can be produced.

Figure 10:
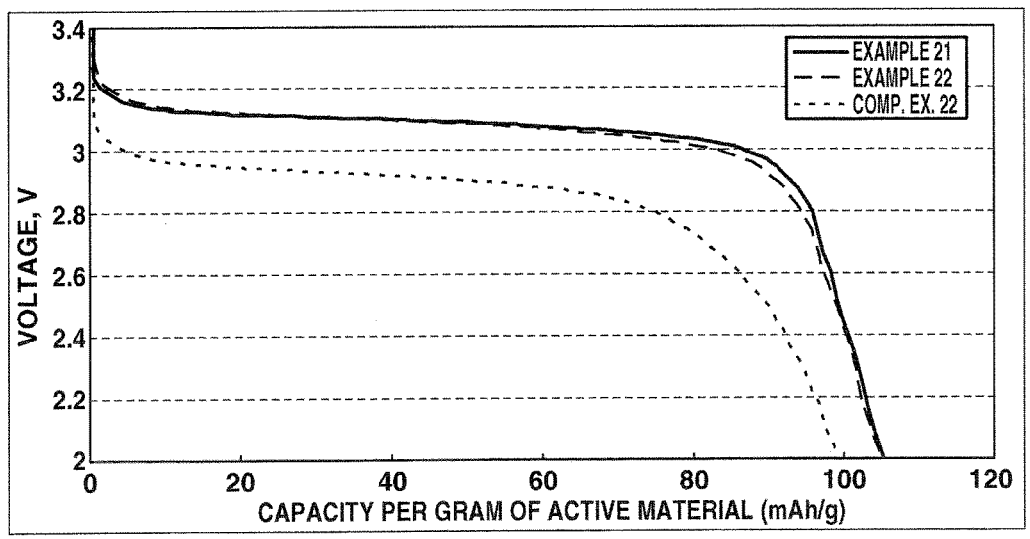
FIG. 10 is a graph showing the discharge curves at a discharge rate of 10 C for the lithium ion secondary batteries produced in Examples 21 and 22 and in Comparative Example 22.

The physical properties as positive electrodes were evaluated for the lithium ion secondary batteries fabricated in Examples 21 and 22 and in Comparative Example 22. FIG. 10 shows the discharge curves at a discharge rate of 10 C.

Current: 0.5 C constant-current charging, 0.5 C, 3 C, 5 C and 10 C constant-current discharging (the capacity of LFP was set to 170 mAh/g and, after increasing the discharge rate every 5 cycles, the discharge rate was ultimately returned to 0.5 C)

Cut-off voltage: 4.50 V to 2.00 V

Temperature: room temperature

As shown in FIG. 10, even when composite current collector B10 which includes a crosslinking agent was used, as with composite current collector B11 which does not include a crosslinking agent, it is apparent that the voltage during discharge is higher than with the use of pure aluminum foil, and that the interfacial resistance is lower.

Figure 11:
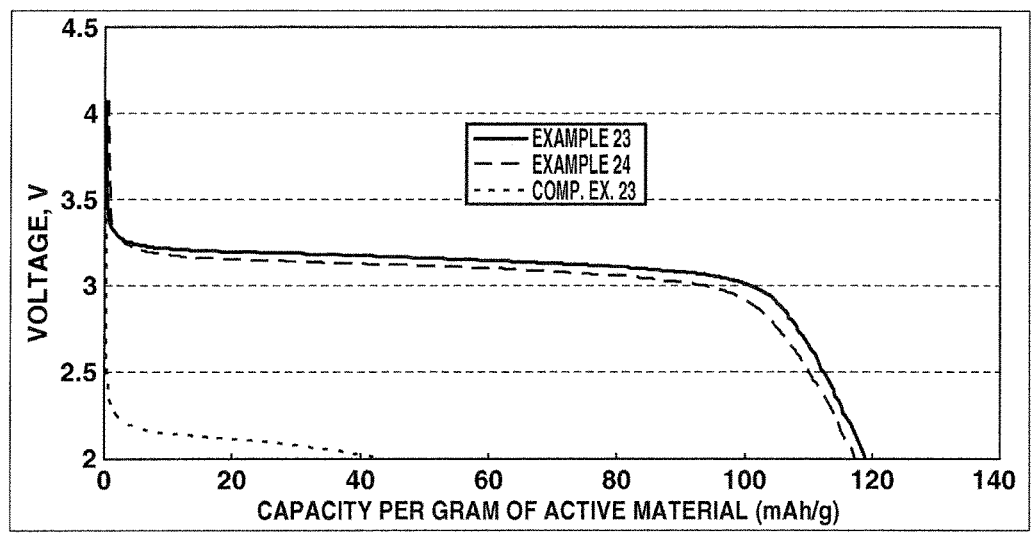
FIG. 11 is a graph showing the discharge curves at a discharge rate of 5 C for the lithium ion secondary batteries produced in Examples 23 and 24 and in Comparative Example 23.

The physical properties as positive electrodes were evaluated for the lithium ion secondary batteries fabricated in Examples 23 and 24 and in Comparative Example 23. FIG. 11 shows the discharge curves at a discharge rate of 5 C.

Current: 0.5 C constant-current charging, 0.5 C, 3 C, 5 C and 10 C constant-current discharging (the capacity of LFP was set to 170 mAh/g and, after increasing the discharge rate every 5 cycles, the discharge rate was ultimately returned to 0.5 C)

Cut-off voltage: 4.50 V to 2.00 V

Temperature: room temperature

As shown in FIG. 11, regardless of the presence or absence of a thickener, it is apparent that the voltage during discharge is higher with the use of a composite current collector than with the use of pure aluminum foil, and that the interfacial resistance is lower.

Figure 12:
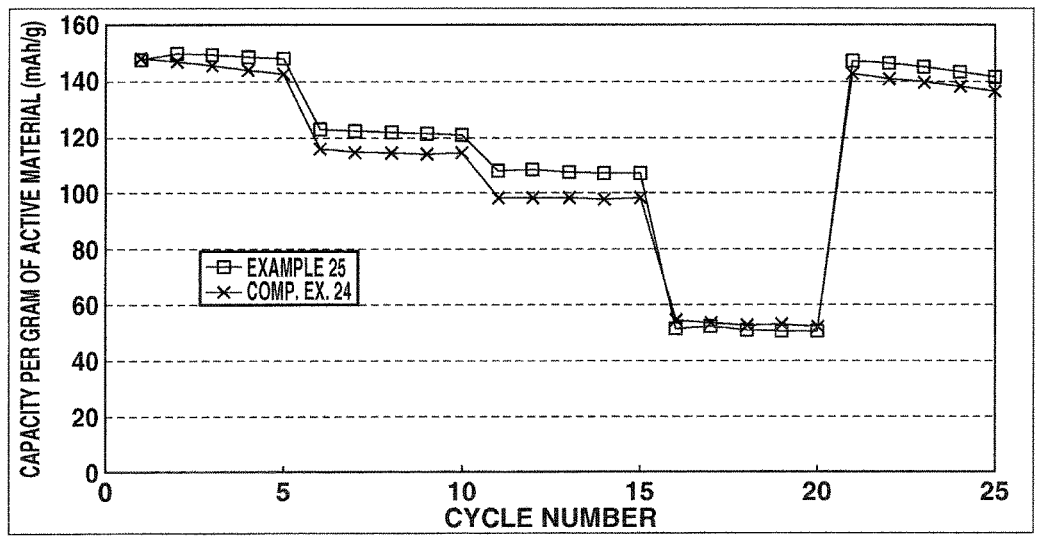
FIG. 12 is a graph showing the cycle/rate characteristics of the discharge capacities for the lithium ion secondary batteries produced in Example 25 and Comparative Example 24.
Figure 13:
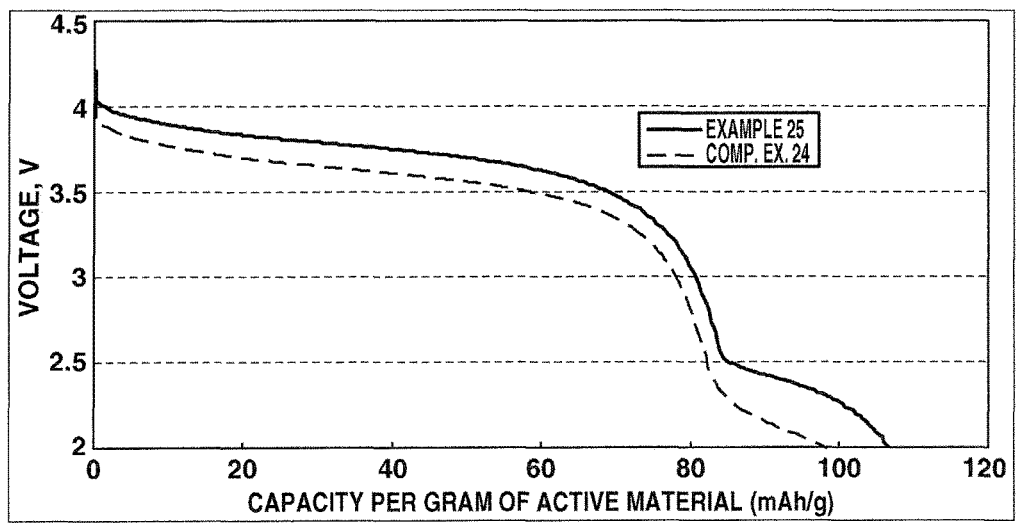
FIG. 13 is a graph showing the discharge curves at a discharge rate of 5 C for the lithium ion secondary batteries produced in Example 25 and Comparative Example 24.

The physical properties as positive electrodes were evaluated for the lithium ion secondary batteries fabricated in Example 25 and Comparative Example 24. FIG. 12 shows the cycle/rate characteristics of the discharge capacity, and FIG. 13 shows the discharge curves at a discharge rate of 5 C. Current: 0.5 C constant-current charging, 0.5 C, 3 C, 5 C and 10 C constant-current discharging (the capacity of LMO was set to 137 mAh/g and, after increasing the discharge rate every 5 cycles, the discharge rate was ultimately returned to 0.5 C)

Cut-off voltage: 4.30 V to 2.00 V

Temperature: room temperature

As shown in FIG. 12, even in lithium ion secondary batteries in which LMO was used, it is apparent that, by having a conductive bonding layer, the percent retention of capacity during high-rate discharge as opposed to low-rate discharge becomes higher. Moreover, as shown in FIG. 13, it is apparent that, by using composite current collector B13, the voltage during discharge can be kept high.

The invention claimed is:

1. An electrically conductive bonding layer-forming composition characterized by comprising a polymer having repeating units of formula (1) or formula (2) below and carbon nanotubes

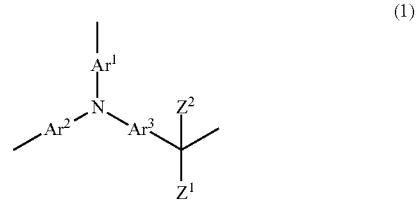

(1)

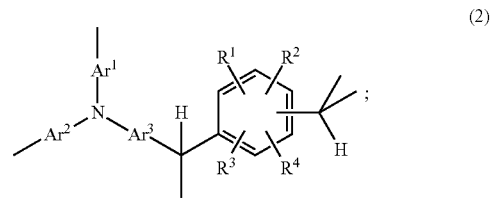

(2)

wherein $Ar^1$ to $Ar^3$ are each independently a divalent organic group of any one of formulas (3) to (7) below

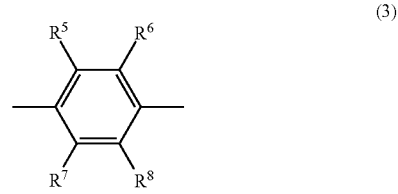

(3)

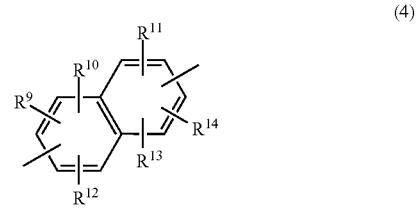

(4)

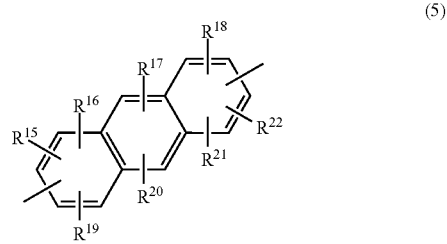

(5)

-continued

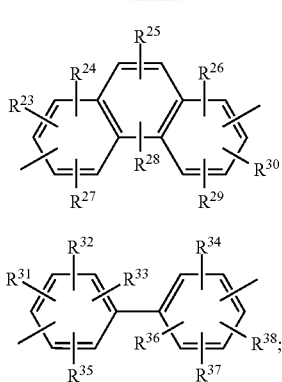

wherein $R^5$ to $R^{38}$ are each independently a hydrogen atom, a halogen atom, an alkyl group of 1 to 5 carbons which may have a branched structure, an alkoxy group of 1 to 5 carbons which may have a branched structure, or a carboxyl group, sulfo group, phosphoric acid group, phosphonic acid group or salt of any thereof;

wherein $Z^1$ and $Z^2$ are each independently a hydrogen atom, an alkyl group of 1 to 5 carbons which may have a branched structure, or a monovalent organic group of any one of formulas (8) to (11) below

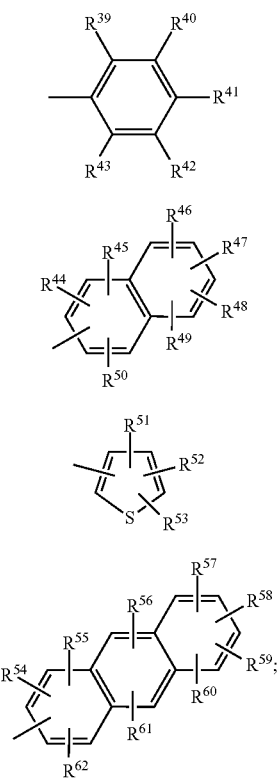

wherein $R^{39}$ to $R^{62}$ are each independently a hydrogen atom, a halogen atom, an alkyl group of 1 to 5 carbons which may have a branched structure, a haloalkyl group of 1 to 5 carbons which may have a branched structure, a phenyl group, $OR^{63}$, $COR^{63}$, $NR^{63}R^{64}$, $COOR^{65}$;

wherein $R^{63}$ and $R^{64}$ being each independently a hydrogen atom, an alkyl group of 1 to 5 carbons which may have a branched structure, a haloalkyl group of 1 to 5 carbons which may have a branched structure, or a phenyl group; and $R^{65}$ being an alkyl group of 1 to 5 carbons which may have a branched structure, a haloalkyl group of 1 to 5 carbons which may have a branched structure, or a phenyl group, or a carboxyl group, sulfo group, phosphoric acid group, phosphonic acid group or salt of any thereof;

with the proviso that $Z^1$ and $Z^2$ are not both alkyl groups at the same time;

wherein $R^1$ to $R^4$ in formula (2) are each independently a hydrogen atom, a halogen atom, an alkyl group of 1 to 5 carbons which may have a branched structure, an alkoxy group of 1 to 5 carbons which may have a branched structure, or a carboxyl group, sulfo group, phosphoric acid group, phosphonic acid group or salt of any thereof; and wherein said polymer contains one or more of $R^1$ to $R^{62}$ that are independently an acidic group selected from the group consisting of the carboxyl group, the sulfo group, the phosphoric acid group, the phosphonic acid group and the salts thereof.

2. The electrically conductive bonding layer-forming composition according to claim 1 which further comprises a matrix polymer.

3. A composite current collector for an energy storage device electrode, comprising a current-collecting substrate, and an electrically conductive bonding layer formed from the electrically conductive bonding layer-forming composition of claim 1 formed on the substrate.

4. The composite current collector for an energy storage device electrode according to claim 3, wherein at least one of $R^1$ to $R^{62}$ is the sulfo group or the salt thereof.

5. The composite current collector for an energy storage device electrode according to claim 3, wherein the repeating units of the polymer are formula (12) below

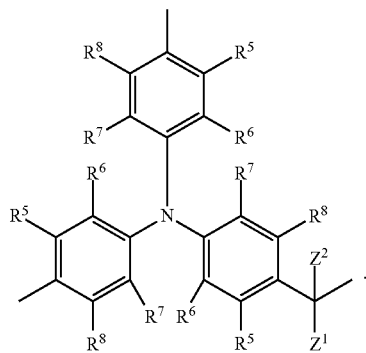

6. The composite current collector for an energy storage device electrode according to claim 5, wherein $Z^2$ is a hydrogen atom.

7. The composite current collector for an energy storage device electrode according to claim 5, wherein $Z^1$ is a hydrogen atom, a thienyl group, or a monovalent organic group of formula (8).

8. The composite current collector for an energy storage device electrode according to claim 5, wherein the repeating units of the polymer are formula (14) below

(14) 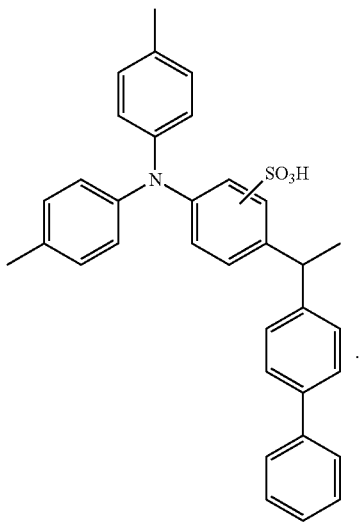

9. The composite current collector for an energy storage device electrode according to claim 3, wherein the electrically conductive bonding layer further comprises a matrix polymer.

10. The composite current collector for an energy storage device electrode according to claim 3, wherein the electrically conductive bonding layer has a thickness of from 0.05 to 10 µm.

11. The composite current collector for an energy storage device electrode according to claim 3, wherein the current-collecting substrate is made of at least one selected from among copper, aluminum, nickel, gold, silver, and alloys thereof, and has a thickness of from 1 to 100 µm.

12. An electrode for an energy storage device, characterized by comprising the composite current collector for an energy storage device electrode according to claim 3, and an active material layer formed on the electrically conductive bonding layer of the composite current collector.

13. A secondary battery comprising the electrode for an energy storage device according to claim 12.

14. A capacitor comprising the electrode for an energy storage device according to claim 12.

* * * * *